US012794335B2

(12) United States Patent
Fiedler

(10) Patent No.: US 12,794,335 B2
(45) Date of Patent: Nov. 10, 2026

(54) DECOUPLED BEARING FOR LINEAR COMPRESSOR

(71) Applicant: Attollo Engineering, LLC, Camarillo, CA (US)

(72) Inventor: Andreas Fiedler, Camarillo, CA (US)

(73) Assignee: Attollo Engineering, LLC, Camarillo, CA (US)

( * ) Notice: Subject to any disclaimer, the term of this patent is extended or adjusted under 35 U.S.C. 154(b) by 15 days.

(21) Appl. No.: 18/422,538

(22) Filed: Jan. 25, 2024

(65) Prior Publication Data

US 2024/0263625 A1 Aug. 8, 2024

Related U.S. Application Data

(63) Continuation-in-part of application No. 18/105,972, filed on Feb. 6, 2023, now Pat. No. 12,381,463.

(51) Int. Cl.
*H02K 41/03* (2006.01)
*F04B 17/04* (2006.01)
(Continued)

(52) U.S. Cl.
CPC ........... *H02K 41/031* (2013.01); *F04B 53/16* (2013.01); *F25B 31/023* (2013.01); *H02K 33/16* (2013.01);
(Continued)

(58) Field of Classification Search
CPC ...... H02K 41/031; H02K 33/16; H02K 33/18; H02K 7/04; H02K 1/2713; F04B 53/14;
(Continued)

(56) References Cited

U.S. PATENT DOCUMENTS 4,675,563 A * 6/1987 Goldowsky ............ H02K 33/10 290/1 R
5,525,845 A * 6/1996 Beale .................... F02G 1/0435 310/90

(Continued)

FOREIGN PATENT DOCUMENTS

CN 106678012 A * 5/2017 .............. F04B 53/14
CN 106704144 A 5/2017

(Continued)

OTHER PUBLICATIONS

CN106678012A translation (Year: 2025).*

(Continued)

*Primary Examiner* — David N Brandt
(74) *Attorney, Agent, or Firm* — Billion & Armitage

(57) ABSTRACT

A linear motor includes a piston cylinder having a first diameter and extending along a first cylindrical axis. The piston cylinder includes a first side wall. A piston is disposed within the piston cylinder and the piston is movable along the first cylindrical axis within the piston cylinder. The linear motor includes a bearing cylinder having a second diameter and extending along a second cylindrical axis. The bearing cylinder includes a second side wall. A bearing is disposed within the bearing cylinder, and the bearing is movable along the second cylindrical axis within the piston cylinder. A linkage mechanically couples the piston to the bearing. A motor stator generates an electromagnetic field. A ferromagnetic feature interacts with the electromagnetic field generated by the motor stator to impart linear force on the piston. The second diameter is greater than the first diameter.

20 Claims, 18 Drawing Sheets

(51) Int. Cl.

| | |
|---|---|
| ***F04B 53/14*** | (2006.01) |
| ***F04B 53/16*** | (2006.01) |
| ***F25B 31/02*** | (2006.01) |
| ***H02K 7/04*** | (2006.01) |
| ***H02K 33/16*** | (2006.01) |
| ***H02K 33/18*** | (2006.01) |

(52) U.S. Cl.
CPC .............. *H02K 33/18* (2013.01); *F04B 17/04* (2013.01); *F04B 53/145* (2013.01); *H02K 7/04* (2013.01)

(58) Field of Classification Search
CPC ........ F04B 53/16; F04B 17/04; F04B 53/144; F04B 53/145; F04B 17/03; F25B 31/023; F25B 31/00; F25B 2400/073; F16C 17/04
See application file for complete search history.

(56) References Cited

U.S. PATENT DOCUMENTS

| | | | | |
|---|---|---|---|---|
| 6,231,310 | B1 | 5/2001 | Tojo et al. | |
| 6,250,895 | B1 | 6/2001 | Kawahara et al. | |
| 6,268,667 | B1 | 7/2001 | Denne | |
| 8,607,560 | B2 | 12/2013 | Fiedler | |
| 2005/0123422 | A1* | 6/2005 | Lilie | F04B 39/0022 417/415 |
| 2006/0220473 | A1 | 10/2006 | Ueda | |
| 2015/0226197 | A1* | 8/2015 | Hahn | F04B 39/122 417/363 |
| 2017/0211562 | A1* | 7/2017 | Hahn | F04B 39/0022 |
| 2019/0245425 | A1 | 8/2019 | Kim et al. | |
| 2022/0140719 | A1 | 5/2022 | Kim | |
| 2023/0017414 | A1* | 1/2023 | Veprik | F04B 53/14 |

FOREIGN PATENT DOCUMENTS

| | | | |
|---|---|---|---|
| CN | 115263715 | A | 11/2022 |
| EP | 0098002 | A2 | 1/1984 |
| JP | 2003102160 | A | 4/2003 |
| JP | 2010041761 | A | 2/2010 |

OTHER PUBLICATIONS electrical4u.com; Magnetic Reluctance_ What is it_ (Formula, Units & Applications) _ Electrical4U; from electrical4u.com/magnetic-reluctance/#google_vignette (Year: 2025).*

"Extended European Search Report Mailed on Apr. 22, 2025", 10 Pages.

Wilson, Kyle B., "High Efficiency Pressure Oscillator for Low-Temperature Pulse Tube Cryocooler", Purdue University Purdue e-Pubs; 2004; 8 pages.

"Communication Pursuant to Article 94(3) EPC mailed on Jun. 30, 2026", 7 Pages.

* cited by examiner

DECOUPLED BEARING FOR LINEAR COMPRESSOR

CROSS-REFERENCE TO RELATED APPLICATION

This application is a continuation-in-part of application Ser. No. 18/105,972, filed Feb. 6, 2023, titled "Adjustable System to Minimize Magnetic Motor Side Loads", which is incorporated by reference herein in its entirety. To the extent appropriate, a claim of priority is made.

BACKGROUND

Various applications (e.g., semiconductors, superconductors, optic systems, etc.) require efficient, low power cooling. Moving magnet and linear reluctance motors are often utilized for low-power cooling due to their high motor efficiency and compact design. In general, a moving magnet motor comprises a moving magnet ring, a rider (i.e., a bearing or piston) limited to two degrees of freedom, and a cylinder.

One of the main limitations of a linear moving magnet or reluctance motor are motor side loads, i.e., (pressure loading) force between the rider and cylinder wall (or bearing sleeve) caused by mis-alignment of the reciprocating magnet ring from the longitudinal axis, mis-alignment of other motor components (e.g., the inner yoke, outer yoke, etc.), or non-uniform magnetization. Such motor side loads may cause wear and rapid deterioration of the cylinder wall and the rider. Misaligned motor components or nonuniform magnet rings may generate side loads. Tight dimensional tolerances of motor parts and alignment of motor components are often required to magnetically center the magnet ring. However, such methods and components are expensive, time consuming, and unreliable.

SUMMARY

According to one or more embodiments of the present disclosure, a linear compressor includes a piston cylinder having a first diameter and extending along a first cylindrical axis. The piston cylinder includes a first side wall. A piston is disposed within the piston cylinder and the piston is movable along the first cylindrical axis within the piston cylinder. The linear motor includes a bearing cylinder having a second diameter and extending along a second cylindrical axis. The bearing cylinder includes a second side wall. A bearing is disposed within the bearing cylinder, and the bearing is movable along the second cylindrical axis within the piston cylinder. A linkage mechanically couples the piston to the bearing. A motor stator generates an electromagnetic field. A ferromagnetic feature interacts with the electromagnetic field generated by the motor stator to impart linear force on the piston. The second diameter is greater than the first diameter.

According to some embodiments, a linear compressor system includes stationary assembly and a rider assembly. The stationary assembly includes a first cylinder having a first cylinder wall extending along a first cylindrical axis. A second cylinder has a second cylinder wall extending along a second cylindrical axis parallel to the first cylindrical axis. The rider assembly is movable along a linear path parallel to the first cylindrical axis. The rider assembly includes a piston disposed within the first cylinder. The piston includes a first bearing surface flush with the first cylinder wall. A bearing is disposed within the second cylinder. The bearing includes a second bearing surface flush with the second cylinder wall. A laterally compliant linkage mechanically couples the piston to the bearing. The first bearing surface is separated from the second bearing surface by a gap spanning a direction perpendicular to the linear path.

BRIEF DESCRIPTION OF DRAWINGS

This written disclosure describes illustrative embodiments that are non-limiting and non-exhaustive. Reference is made to illustrative embodiments that are depicted in the figures, in which.

DETAILED DESCRIPTION

Figure 1:
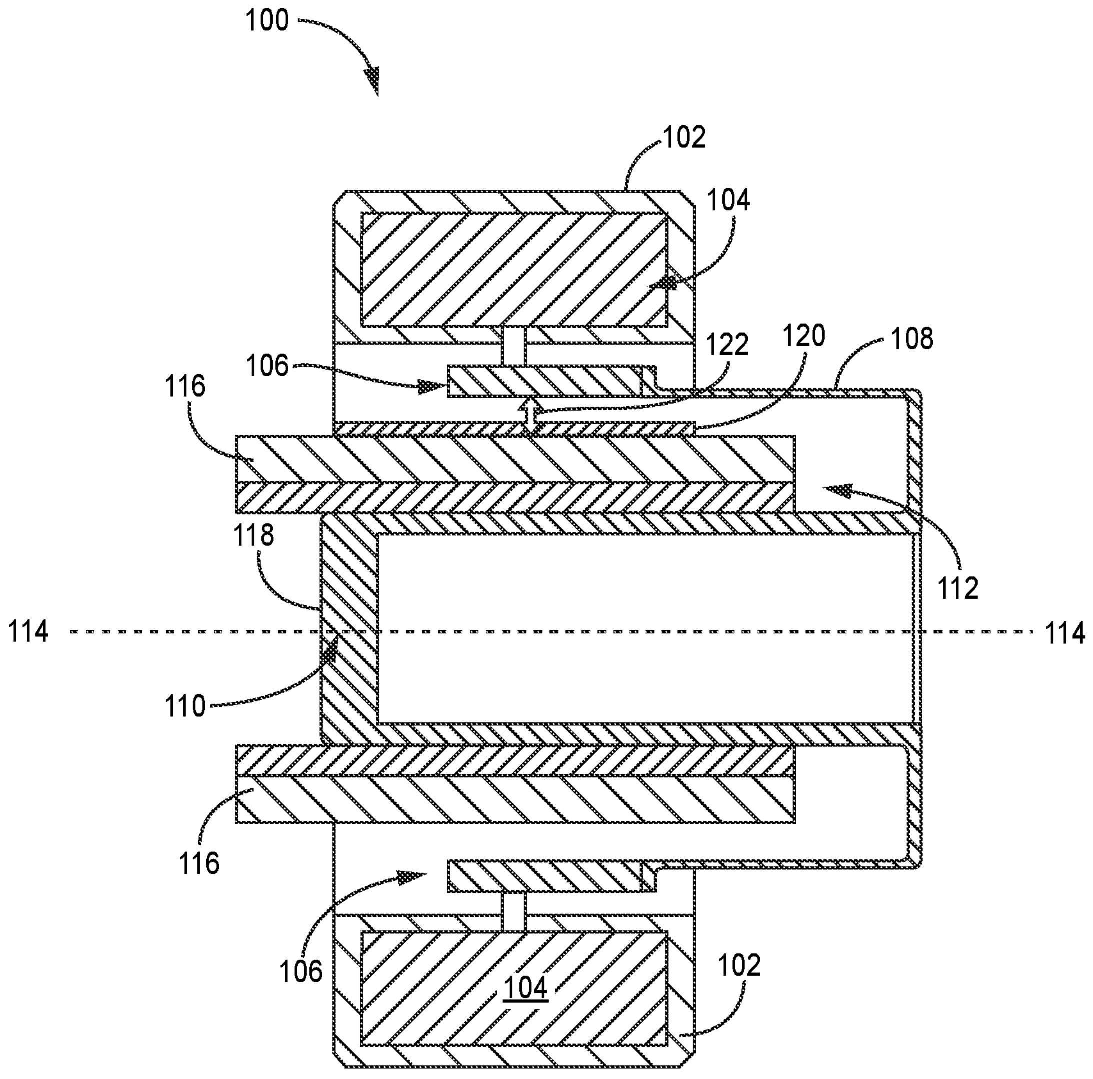
FIG. 1 illustrates a cross sectional side view of a moving magnet motor system having one or more ferromagnetic rods located on an inner yoke, according to some embodiments.

In some embodiments, the present disclosure is directed to a linear motor (or linear compressor) having a reciprocating gas-driving element (i.e., a piston) and having a reciprocating member in-contact with the cylinder (i.e., a bearing). The piston may be laterally decoupled from the bearing, i.e., the outer surface of the bearing may be separated from the outer surface of the piston. Decoupling the piston from the side-load bearing function of the bearing may provide numerous benefits to the linear compressor. In general, linear motors (or linear compressors) used for cryo-refrigerators operate at a resonant frequency for maximum compressor efficiency. The compression and expansion of a filling gas acts as a spring component upon the piston. By selecting the diameter of the piston, the gas-spring constant is adjusted to thereby achieve a target resonant frequency of the system. Thus, to achieve the target resonant frequency aligned with the desired operational frequency of the cooler, the maximum piston diameter is severely limited. However, a small or severely limited piston diameter reduces the bearing surface of the piston, and thus, a greater bearing load per surface area is placed on the piston and piston bearing surface. The increase in piston-bearing load may reduce the lifetime of the compressor. Decoupling the piston from the side-load bearing function of the bearing enables the piston diameter to remain small, thereby aligning the resonant frequency with the desired operational frequency of the system, while simultaneously providing a greater bearing surface area to reduce the bearing load placed on the piston. Thus, the bearing load per bearing surface area is reduced, which increases the lifetime of the linear compressor due to reduced piston wear. This allows the desired resonant frequency to be selected via the piston diameter independently from the compressor bearing dimensions, enhancing the operating efficiency of the linear motor.

In some embodiments, the present disclosure is directed to a moving magnet motor having a magnetic ring coupled to a rider (i.e., a piston), the rider limited to linear movement upon a cylindrical axis wherein the longitudinal center of a cylinder defines the cylindrical axis. The moving magnet motor may be a linear motor having a moving magnet component affixed to a rider or piston. The moving magnet motor further comprising an outer yoke, an inner yoke, and a ferromagnetic rod running parallel to the cylindrical axis, the one or more ferromagnetic rods in magnetic communication with the magnetic ring. The ferromagnetic rod may be disposed on an outer surface of the inner yoke, on an inner surface of the outer yoke, or more generally, the ferromagnetic rod may be disposed anywhere between a coil located within the outer yoke and the rider. In some embodiments, the inner yoke further includes one or more rotatable rings, the rotatable rings disposed at a proximal end and distal end of each ferromagnetic rod. In some embodiments, the coil located in the outer yoke is driven with an AC signal to generate a magnetic field that interacts with the magnetic field of the magnetic ring to induce oscillation of the magnetic ring, and thus, oscillation of the rider in the cylinder. The one or more ferromagnetic rods located within the magnetic fields likewise generate an auxiliary force that is perpendicular to the longitudinal axis. Proper positioning of the one or more ferromagnetic rods causes the auxiliary force to cancel out or minimize the bearing side load forces caused by the motor magnet ring. As used hereinafter, the term “bearing side load” refers to side load forces between the rider and the bearing sleeve (i.e., a cylinder wall).

The linear magnetic motors described herein may be utilized in various applications, including but not limited to Stirling engines, Stirling coolers, integral Stirling coolers, split Stirling coolers, pumps, linear pumps, compressors, or other applications where linear motion or linear motors are utilized. The linear magnetic motors described herein may also be referred to as linear engines, linear transducers, linear actuators, or linear generators.

In some embodiments, the one or more ferromagnetic rods are adjustable around the circumference of the inner yoke, i.e., the ferromagnetic rods may be rotated around the circumference of the inner yoke and locked into place. The ferromagnetic rods may be positioned to offset or counteract side load forces. In some embodiments, a single ferromagnetic rod may be used to offset or counteract side load force. However, utilizing two or more ferromagnetic rods allows for simple tuning of the direction and magnitude of the auxiliary force to counteract the side load forces. For instance, if the moving magnetic motor is perfectly centered with no bearing side loads, the two ferromagnetic rods could be placed 180° apart to cancel each other out (assuming the two ferromagnetic rods had equivalent proportions and magnetic properties). Or in a more practical example, the two ferromagnetic rods could be selectively positioned to offset or minimize a bearing side load force in a y-direction while the two ferromagnetic rods offset each other's x-direction force components. In contrast, a moving magnet motor having a single ferromagnetic rod would have nothing (other than a motor side load force) to counteract any excess auxiliary force generated by the single ferromagnetic rod. Thus, the single ferromagnetic rod embodiment would require the single ferromagnetic rod generate the precise bearing side load force in precisely the opposite direction of the bearing side load.

In one embodiment, two ferromagnetic rods are disposed on the outer surface of the inner yoke. Each of the ferromagnetic rods are affixed to two rotatable rings. The rotatable rings are configured to secure to the outer surface of the inner yoke in a groove (or ring detent) and are slidable around the circumference of the inner yoke. Therefore, the two ferromagnetic rods can be selectively positioned to generate a magnetic auxiliary force upon the magnetic ring and improve linear motor alignment.

FIG. 1 illustrates a cross-sectional side view of a moving magnet motor system 100, including an outer yoke 102 housing a coil 104. The moving magnet motor system 100 includes a linear bearing system, the linear bearing system including a rider 110 (i.e., a piston) and a bearing liner 112 (i.e., a bearing sleeve). A magnetic ring 106 is disposed radially inward from the outer yoke 102 is supported on a proximal side by a magnet ring support structure 108. The magnetic ring 106 defines a magnetic ring central axis 114. The magnet ring support structure 108 is affixed to the rider 110 disposed within a cylinder 118. The cylinder 118 is disposed within an inner yoke 116 of the motor system 100. One or more ferromagnetic rods 120 (the ferromagnetic rod 120 may also be referred to as "magnetic rod") are disposed on the outer surface of the inner yoke 116 and are configured to provide a first magnetic interaction 122 between the magnetic ring 106 and the one or more ferromagnetic rods.

The rider 110 of the linear bearing system is configured to oscillate longitudinally along the magnetic ring central axis 114. The oscillation of the rider 110 is driven by electromagnetic interaction between the coil 104 and the magnetic ring 106. More specifically, an electrical (AC) current may be provided to the coil 104 which thereby generates a magnetic field that interacts with (i.e., supplies a magnetic force to) the magnetic ring 106 attached to the rider 110, causing the bearing to oscillate. In some embodiments, the oscillation frequency of the rider 110 may be between 1 Hz and 140 Hz, and in some embodiments, the oscillation frequency of the rider 110 may be between 30 Hz and 60 Hz.

The moving magnet motor system 100 includes the ferromagnetic rod 120 disposed on an outer surface of the inner yoke 116. The ferromagnetic rod 120 may be formed of iron, iron alloys or compounds, cobalt, nickel, and/or other rare-earth metals with ferromagnetic properties. In some embodiments, the ferromagnetic rod 120 may be fully or partially magnetized. The ferromagnetic rod 120 is configured to have a first magnetic communication 122 with the magnetic ring 106. The term "magnetic communication" refers to the interaction of magnetic fields which may result in a magnetic force acting on the respective components. The first magnetic communication 122 may be configured to magnetically center the inner yoke 116, the outer yoke 102, and the magnetic ring 106 on the magnetic ring central axis 114, or to otherwise reduce a motor side load.

In some embodiments, the magnetic ring 106 need not include a circular outer perimeter, but rather, may include a polygon shape and/or be comprised of a plurality of segments. As used hereinafter, the term "rider" (i.e., rider 110) may include a shaft, a bearing, a piston, and/or a sleeve, or any other linear bearing components known in the art. In some embodiments, the liner 112 is not required.

In some embodiments, the ferromagnetic rod 120 includes a rectangular cross-sectional profile. The length of the ferromagnetic rod 120 may extend continuously past the coil on one or more sides. In some embodiments, the ferromagnetic rod 120 may have a length extending farther than, or equal to, the travel of the magnetic ring 106. In other words, the magnetic ring 106 will be adjacent the ferromagnetic rod 120 as the magnetic ring 106 oscillates, and no part of the magnetic ring 106 will extend past the ferromagnetic rod 120 in either direction. The ferromagnetic rod 120 may have uniform ferromagnetic properties throughout. In other embodiments, the ferromagnetic rod 120 may include a circular, triangular, or other geometric cross-sectional profile. The ferromagnetic rod 120 may have non-uniform ferromagnetic properties.

Figure 2:
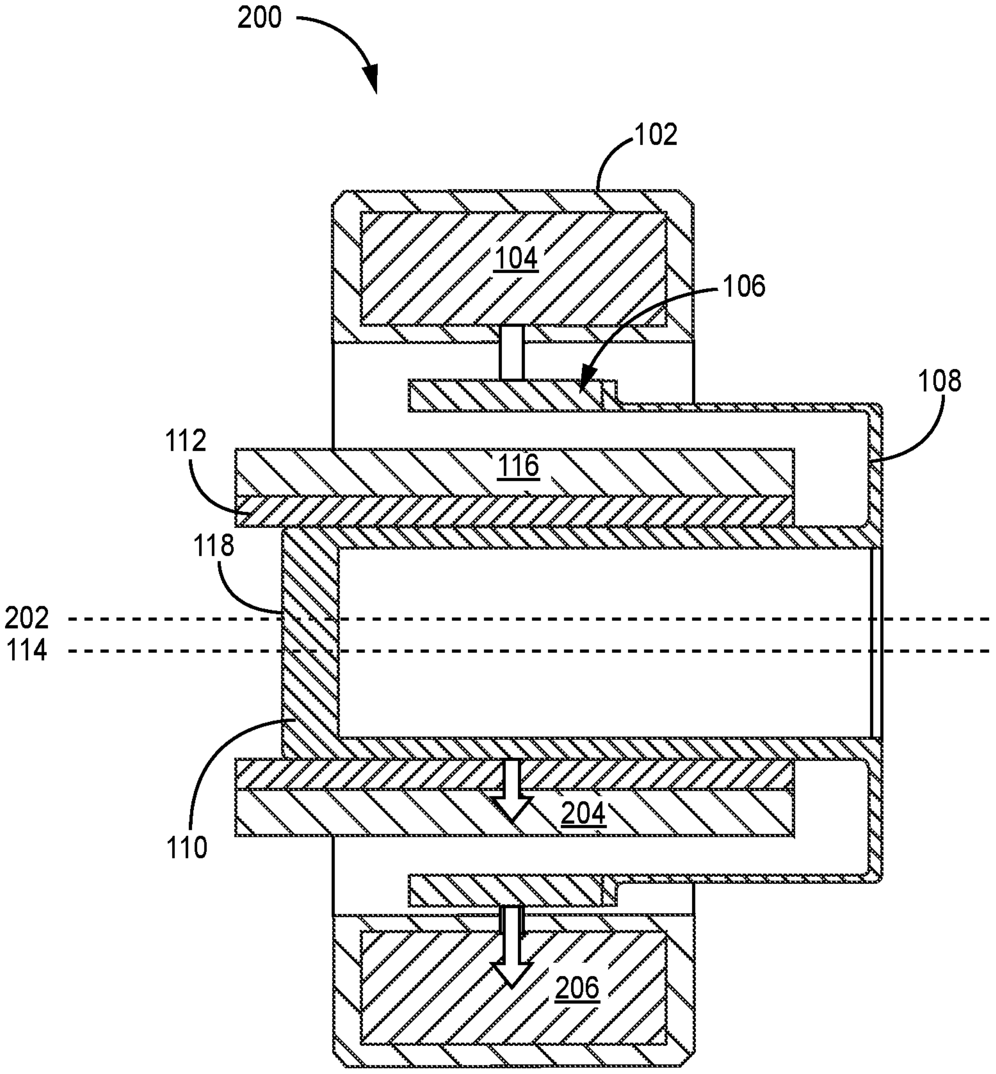
FIG. 2 illustrates a cross sectional side view of a moving magnet motor system having an outer yoke, an inner yoke, a magnetic ring, a rider, and a cylinder, the magnetic ring axis is offset from the motor axis, according to some embodiments.

For instance, FIG. 2 illustrates a moving magnet motor system 200 without a ferromagnetic rod. The magnetic ring central axis 114 is offset from an outer yoke central axis 202, or in other words, the components of the moving magnet motor system 200 are misaligned. Arrow 204 indicates a bearing side load 204 (also referred to as "a motor side load") between the rider 110 and the cylinder liner 112 which results from misalignment of one or more motor components. In some cases, the misalignment can be caused by a nonuniform magnetic (or auxiliary) force, represented by arrow 206, between the magnetic ring 106 and the outer yoke 202. Therefore, one or more ferromagnetic rods may be inserted and positioned within the moving magnet motor system 200, wherein the ferromagnetic rod interacts with the magnetic ring 106 to oppose the nonuniform auxiliary force 206, and thus, minimize or counteract the bearing side load 204.

Figure 3A:
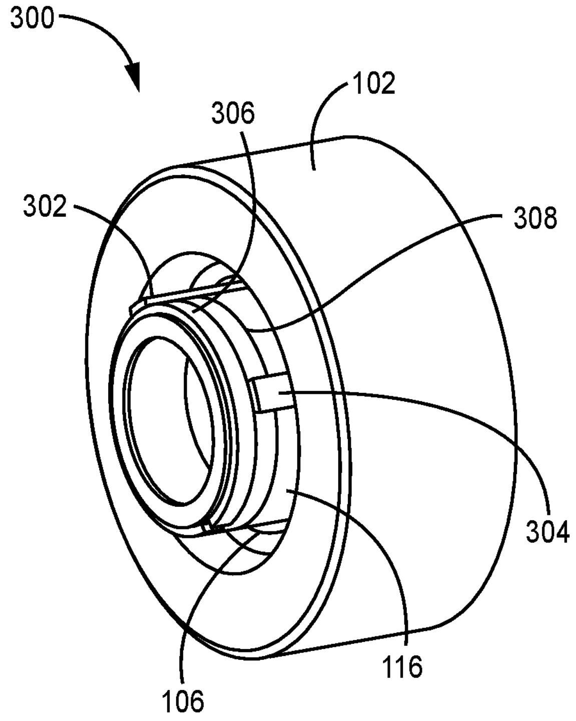
FIG. 3A illustrates an isometric view of a moving magnet motor including two ferromagnetic rods disposed on the outer surface of the inner yoke, according to some embodiments.

FIG. 3A illustrates an isometric view of a moving magnet motor 300 including a first ferromagnetic rod 302 and a second ferromagnetic rod 304 positioned radially inward of the outer yoke 102 and the magnetic ring 106 (the rider and cylinder are removed for viewing purposes). The first ferromagnetic rod 302 and the second ferromagnetic rod 304 are secured to a first ring 306 and a second ring 308, respectively, and extend parallel to a longitudinal axis of the inner yoke 116. The first ring 306 and the second ring 308 are disposed on an outer surface of the inner yoke 116. In some embodiments, a single ring may be used to secure the one or more ferromagnetic rods to the moving magnet motor 300. In other embodiments, the moving magnet motor 300 may include two or more rings.

Figure 3B:
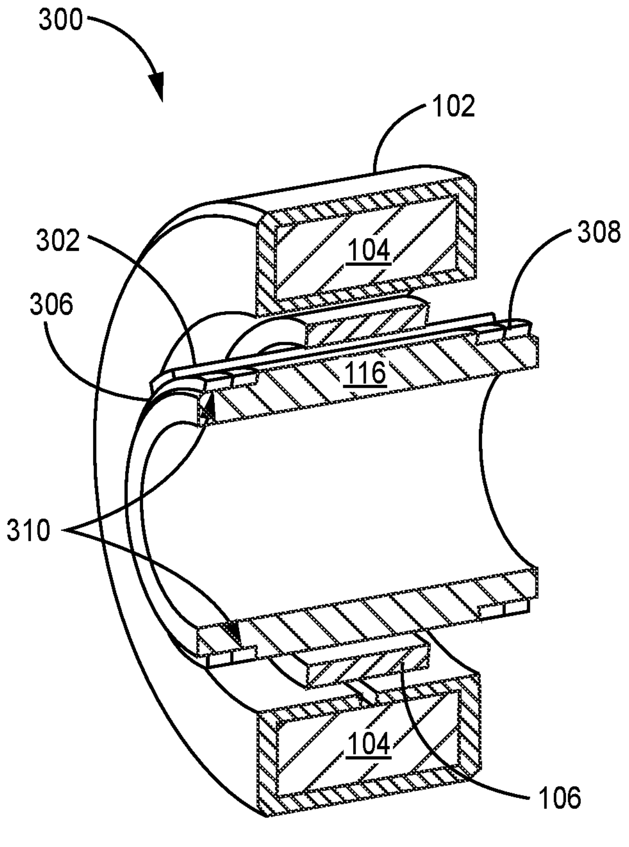
FIG. 3B illustrates a cross sectional isometric view of a moving magnet motor including two ferromagnetic rods disposed on the outer surface of the inner yoke, according to some embodiments.

FIG. 3B illustrates a cross-sectional isometric view of the moving magnet motor 300. In some embodiments, the inner yoke 116 includes a ring detent 310 such that the first ring 306 and the second ring 308 may be flush with the outer surface of the inner yoke. The ring detent 310 may be configured to partially house and/or support one or more rings and may be positioned at any location on the outer surface of the inner yoke 116. In the embodiment illustrated in FIGS. 3A-3B, the ring detent 310 is positioned at the ends of the inner yoke 116 to facilitate assembly and/or removal of the first ring 306 and the second ring 308 from the moving magnet motor 300.

The first ring 306, the second ring 308, and/or the ring detent 310 may be configured to allow slidable adjustment of the locations of the first ferromagnetic rod 302 and the second ferromagnetic rod 304 along the circumference of the inner yoke 116. For instance, the first ring 306 secured to the first ferromagnetic rod 302 may be rotated clockwise or counterclockwise around the circumference of the inner yoke 116. Likewise, the second ring 308 secured to the second ferromagnetic rod 304 may be rotated clockwise or counterclockwise around the circumference of the inner yoke 116. The first ferromagnetic rod 302 and the second ferromagnetic rod 304 may be selectively locked into a desired position. Thus, the position of each of the ferromagnetic rods 302, 304 are selectively adjustable.

Figure 3C:
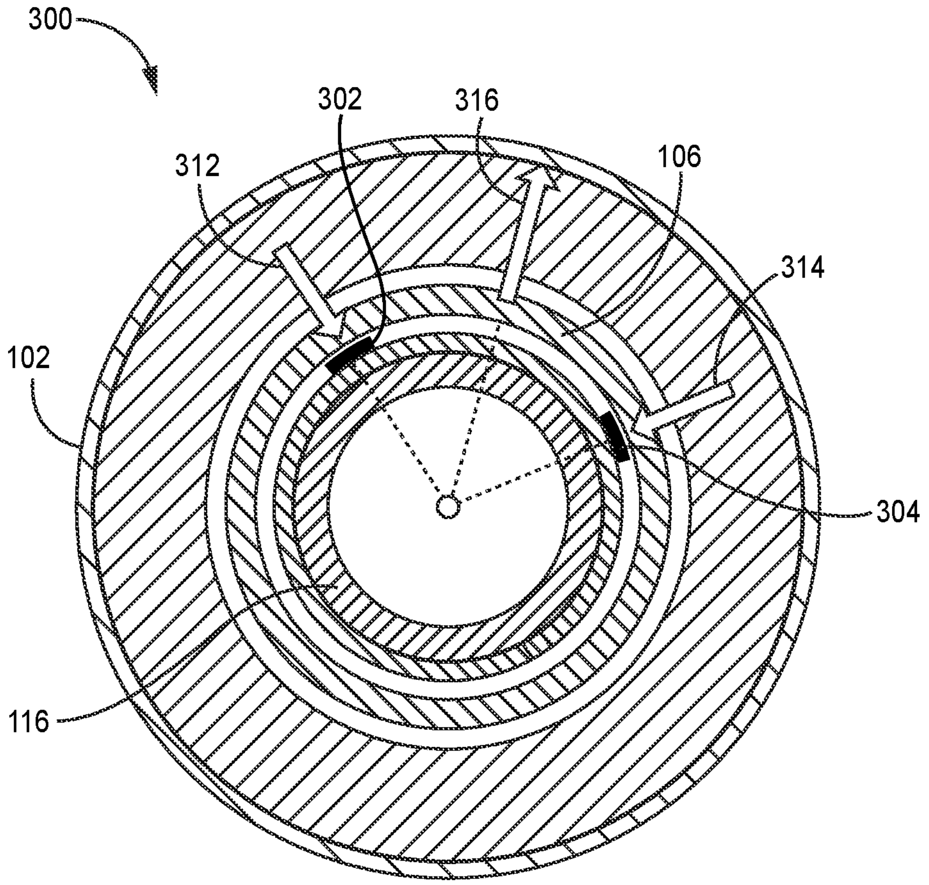
FIG. 3C illustrates a front view of a moving magnet motor including two ferromagnetic rods disposed on the outer surface of the inner yoke, according to some embodiments.

FIG. 3C illustrates a front view of the moving magnet motor 300 (with the rider and cylinder removed for viewing purposes). The first ferromagnetic rod 302 is selectively positioned to provide a first auxiliary force 312 upon the magnet ring 106. The first auxiliary force 312 may be generated via electromagnetic interaction of two or more of the coil 104, the magnetic ring 106, and/or the first ferromagnetic rod 302. The second magnetic rod 304 is selectively positioned to provide a second auxiliary force 314. The second auxiliary force 314 may be generated via electromagnetic interaction the magnetic ring 106 and the second ferromagnetic rod 304. The first auxiliary force 312 and the second auxiliary force 314 may offset or counteract a side load force 316, or in other words, the sum of the first auxiliary force 312, the auxiliary force 314, and the side load force 316 is approximately zero. Thus, the total side load force is substantially reduced.

In some embodiments, the first ferromagnetic rod 302 and the second ferromagnetic rod 304 may be selectively positioned to generate combined auxiliary force to offset a side load force. For instance, positioning one or more of the first ferromagnetic rod 302 and the second ferromagnetic rod may generate a combined auxiliary force having an equal magnitude to the side load force oriented in an opposite direction (180°) from the side load force. Thus, the selective positioning of the first ferromagnetic rod 302 and/or the second ferromagnetic rod 304 may allow a user to control a magnitude and a direction of a combined auxiliary force to offset a side load force.

In some embodiments, one or more properties of the ferromagnetic rod may be selected to control a magnitude of an auxiliary force. For instance, the shape of the rod, the uniform/non-uniform ferromagnetic properties along the length of the rod, the distance between the rod and the coil, the number of rods used, etc., may impact a magnitude of an auxiliary force.

Figure 4A:
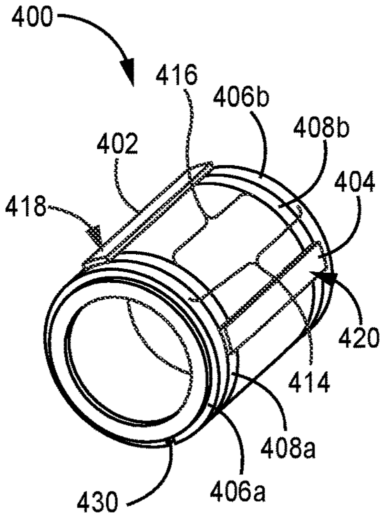
FIG. 4A illustrates an isometric view of an inner yoke of a moving magnet motor including two ferromagnetic rods disposed on the outer surface of the inner yoke, according to some embodiments.
Figure 4B:
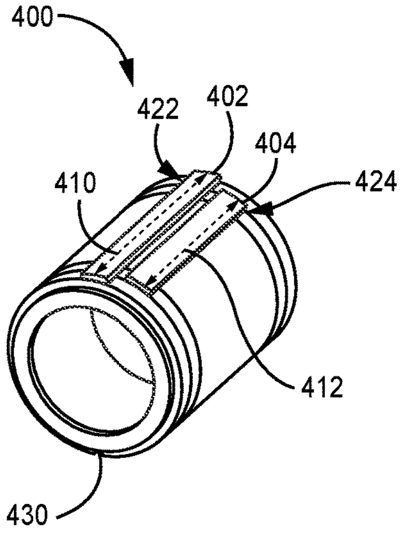
FIG. 4B illustrates an isometric view of an inner yoke of a moving magnet motor including two ferromagnetic rods disposed on the outer surface of the inner yoke, according to some embodiments.
Figure 4C:
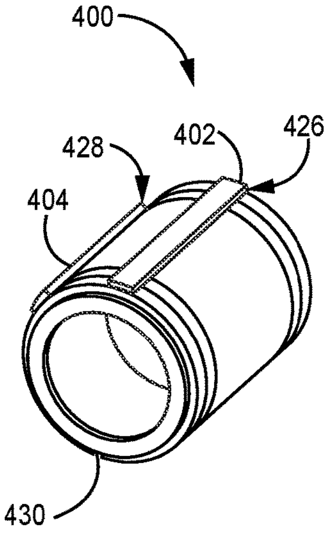
FIG. 4C illustrates an isometric view of an inner yoke of a moving magnet motor including two ferromagnetic rods at different locations disposed on the outer surface of the inner yoke, according to some embodiments.

FIGS. 4A-4C illustrate isometric views of an inner yoke 400 having a first ferromagnetic rod 402 and a second ferromagnetic rod 404 disposed on the outer surface of the inner yoke 400. The first ferromagnetic rod 402 is secured to a first pair of rings 406*a*, 406*b*. In some embodiments, the ring 406*a* may be secured on an end of the first ferromagnetic rod 402 and the ring 406*b* may be secured on an opposing end of the first ferromagnetic rod 402. The distance between the ends of the first ferromagnetic rod 402 defines a first rod length 410 and the distance between the first pair of rings 406*a*, 406*b* defines a first ring distance 414. In some embodiments, the ring 408*a* may be secured on an end of the second ferromagnetic rod 404 and the ring 408*b* may be secured on an opposing end of the second ferromagnetic rod 404. The distance between the ends of the second ferromagnetic rod 404 defines a second rod length 412 and the distance between the second pair of rings 408*a*, 408*b* defines a second ring distance 416. In the embodiment shown in FIGS. 4A-4C, the first rod length 410 is greater than the second rod length 412, and the first ring distance 414 is greater than the second ring distance 416. In other embodiments, the rod lengths 410, 412 may be equal and the ring distances 414, 416 may be equal. The rings 406, 408 include a ring notch 430 which may be configured to aid in the assembly and/or removal of the rings 406, 408 from the inner yoke 400, aid in the selective rotation of the rings 406*a*, 406*b*, 408*a*, 408*b* around the circumference of the inner yoke, and/or aid in selectively locking the rings 406*a*, 406*b*, 408*a*, 408*b* into a location. In some embodiments, a single ring may be used to secure a ferromagnetic rod to the inner yoke. In other embodiments, three or more rings may be used to secure a ferromagnetic rod to the inner yoke.

FIGS. 4A-4C illustrate the selective adjustment of the locations of the first ferromagnetic rod 402 and the second ferromagnetic rod 404. The inner yoke 400, the first pair of rings 406*a*, 406*b*, and the second pair of rings 408*a*, 408*b* may be configured to allow slidable adjustment of the locations of the first ferromagnetic rod 402 and the second ferromagnetic rod 404 along the circumference of the inner yoke 400. The first pair of rings 406*a*, 406*b* secured to the first ferromagnetic rod 402 may be rotated clockwise or counterclockwise around the circumference of the inner yoke 400. Likewise, the second pair of rings 408*a*, 408*b* secured to the second ferromagnetic rod 404 may be rotated clockwise or counterclockwise around the circumference of the inner yoke 400. The first ferromagnetic rod 402 and the second ferromagnetic rod 404 may be selectively locked into a desired position. Thus, the position of each of the ferromagnetic rods 302, 304 are selectively adjustable. For instance, FIG. 4A illustrates the first ferromagnetic rod 402 located at a first position 418 and the second ferromagnetic rod 404 located at a second position 420. FIG. 4B illustrates the first ferromagnetic rod 402 located at a third position 422 and the second ferromagnetic rod 404 located at a fourth position 424. FIG. 4C illustrates the first ferromagnetic rod 402 located at a fifth position 426 and the second ferromagnetic rod 404 located at a sixth position 428. The first ferromagnetic rod 402 and the second ferromagnetic rod 404 may be positioned at any location around the circumference of the inner yoke 400, or in other words, the ferromagnetic rods 402, 404 are capable of infinite/continuous locations around the circumference of the inner yoke 400. In some embodiments, the first ferromagnetic rod 402 and the second ferromagnetic rod 404 may be disposed on the same circumferential plane, and thus, may not be capable of overlapping. In other embodiments, the first ferromagnetic rod 402 and the second ferromagnetic rod 404 may be disposed at different circumferential planes and/or be shaped to allow for complete or partial overlapping.

Figure 5:
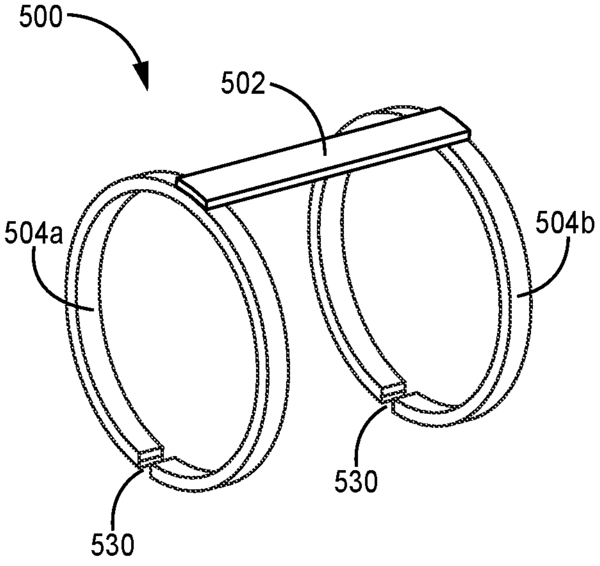
FIG. 5 illustrates an isometric view of an alignment assembly including a ferromagnetic rod and two rotatable rings, according to some embodiments.

FIG. 5 illustrates an isometric view of an alignment assembly 500. The alignment assembly 500 includes a ferromagnetic rod 502 secured to a pair of rings 504*a*, 504*b*. The ferromagnetic rod 502 is secured to the ring 504*a* at an end and secured to the ring 504*b* at the opposite end of the ferromagnetic rod 502. The pair of rings 504*a*, 504*b* each include a ring notch 530. The alignment assembly 500 may be used to align one or more moving magnet motor components (not shown in FIG. 5) and/or to offset or counteract a bearing side load on a moving magnet motor (not shown in FIG. 5). In some embodiments, the ring notch 530 may be configured to enhance the selective positioning of the ring 504*a*, 504*b*, and therefore the positioning of the ferromagnetic rod 502, by providing an engagement surface to rotate the rings 504*a*, 504*b*. In some embodiments, the ring notch 530 may provide the ring 504*a*, 504*b* additional flexibility, spring force, and/or a snap-on/snap-off capability.

The above FIGS. 1-5 describe embodiments/components of a moving magnet motor system wherein the one or more ferromagnetic rods are located on the outer surface of the inner yoke. However, as described below, the one or more ferromagnetic rods may be positioned on other components of the moving magnet motor, e.g., the outer yoke, the magnetic ring, or a combination of two or more of the inner yoke, the outer yoke, and the magnetic ring. Furthermore, the length and cross-sectional shape of each of the ferromagnetic rods may vary.

Figure 6:
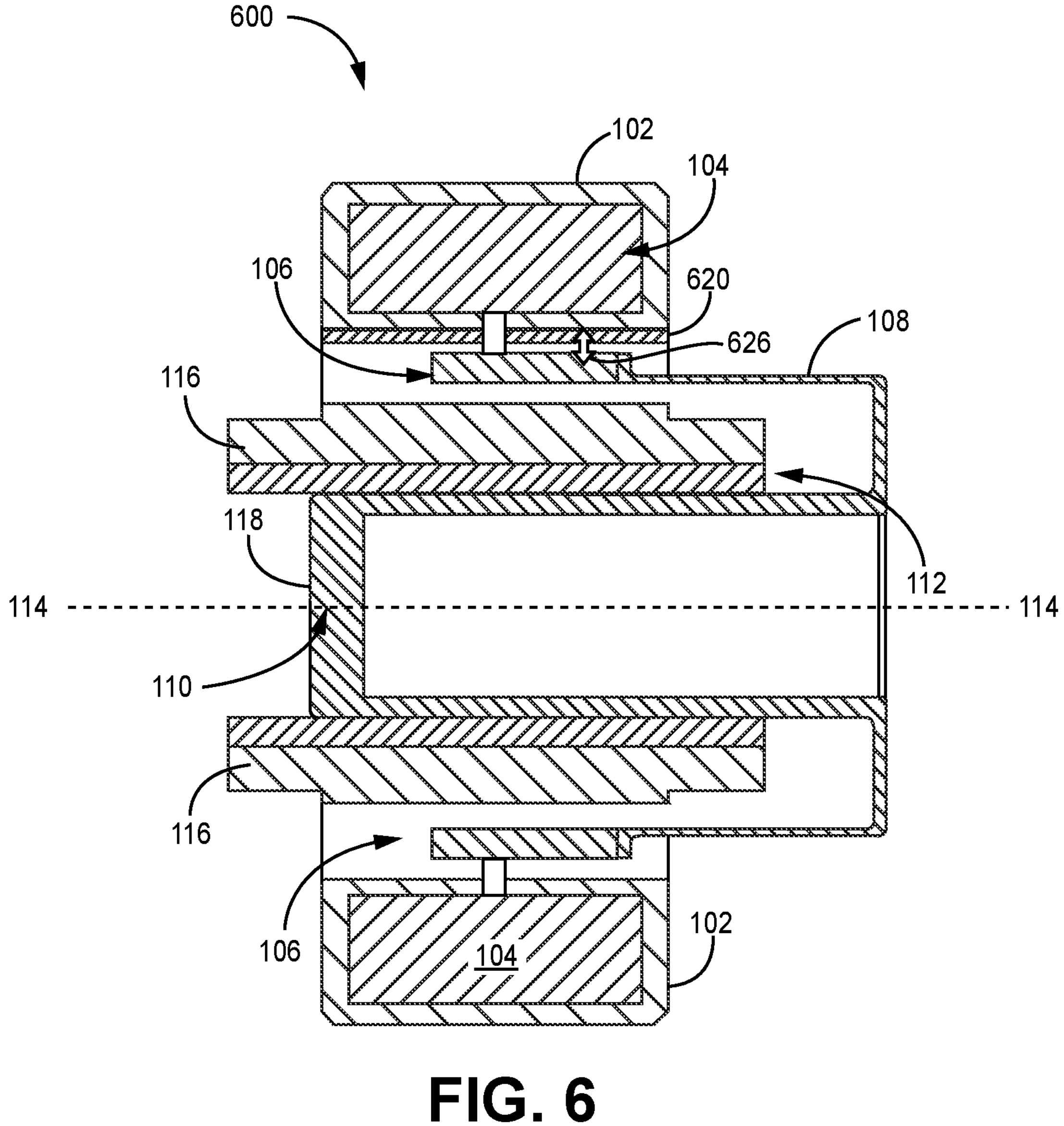
FIG. 6 illustrates a cross sectional side view of a moving magnet motor system having one or more ferromagnetic rods disposed on an outer yoke, according to some embodiments.

FIG. 6 illustrates a cross-sectional side view of a moving magnet motor system 600 including a ferromagnetic rod 620 disposed on the inner surface of the outer yoke 102. Aside from the location of the ferromagnetic rod 620 on the outer yoke 102, FIG. 6 is otherwise identical to FIG. 1 (illustrating the ferromagnetic rod 120 located on the inner yoke 116). The ferromagnetic rod 620 may provide an auxiliary force 626 upon the magnetic ring 106, thereby minimizing a side load force or aligning one or more moving magnet engine components. In some embodiments, the one or more ferromagnetic rods 620 disposed on the inner surface of the outer yoke 102 may be positionally adjustable via one or more rings (not shown) disposed on the inner surface of the outer yoke 102.

Figure 7:
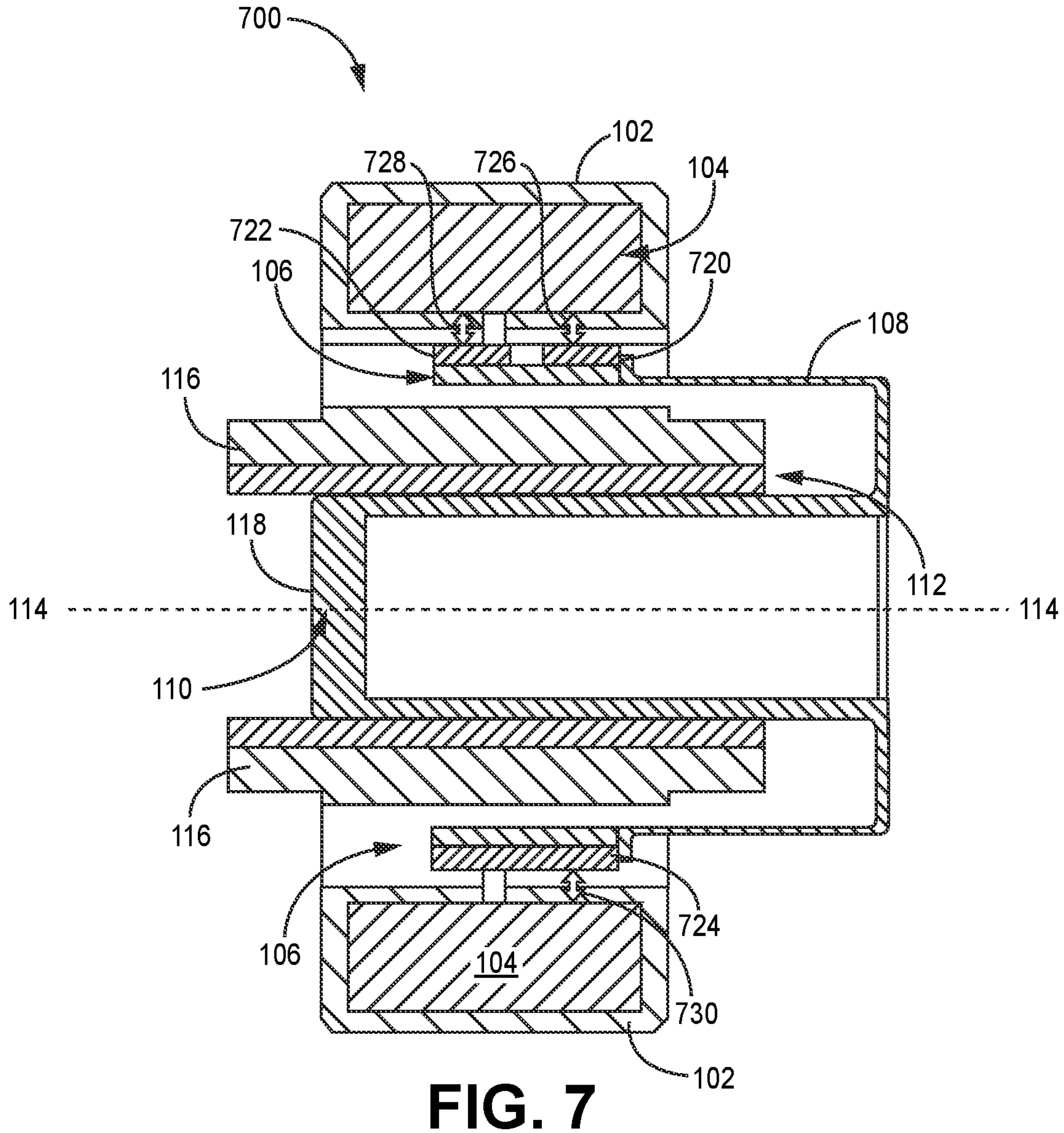
FIG. 7 illustrates a cross sectional side view of a moving magnet motor system having one or more ferromagnetic rods disposed on a magnetic ring, according to some embodiments.

FIG. 7 illustrates a cross-sectional side view of a moving magnet motor system 700 including a first ferromagnetic rod 720, a second ferromagnetic rod 722, and a third ferromagnetic rod 724 disposed on an outer surface of the magnetic ring 106. Other than the location of the ferromagnetic rods 720, 722, 724 on the magnetic ring 106, FIG. 7 is otherwise identical to FIG. 1 (illustrating the ferromagnetic rod 120 located on the inner yoke 116). The outer yoke 102 may provide a first auxiliary force 726, a second auxiliary force 728, and a third auxiliary force 730 upon the first ferromagnetic rod 720, the second ferromagnetic rod 722, and the third ferromagnetic rod 724, respectively, disposed on an outer surface of the magnetic ring 106. Thus, the auxiliary forces 726, 728, 730 provided on the magnetic ring 106 may minimize a side load force or magnetically align one or more moving magnet engine components.

In some embodiments, one or more of the ferromagnetic rods 720, 722, 724 may include two distinct sections along an axis. For instance, the ferromagnetic rod 720 defines a first section along an axis and the ferromagnetic rod 722 defines a second section along the axis.

Figure 8:
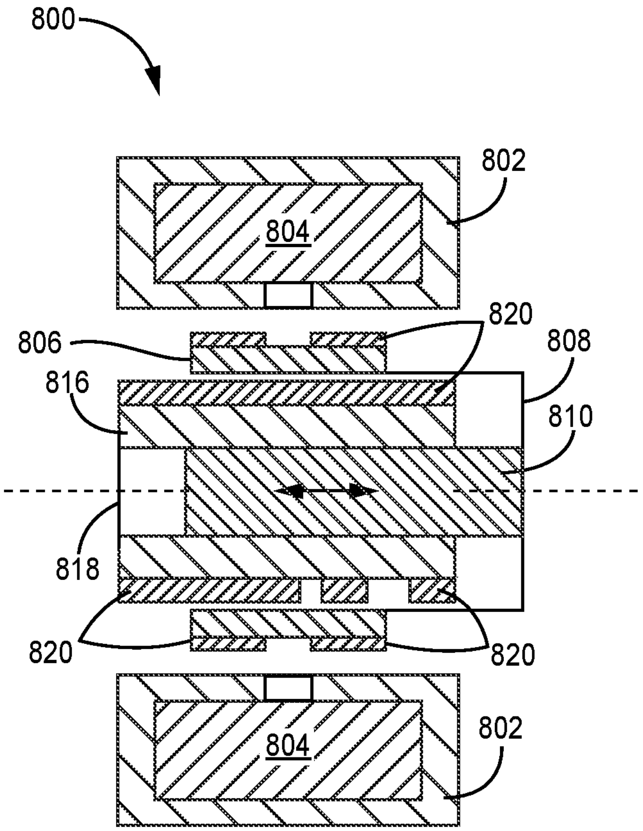
FIG. 8 illustrates a diagrammatic side view of a moving magnet motor system having one or more ferromagnetic rods disposed on a magnetic ring and disposed on an inner yoke, according to some embodiments.

FIG. 8 illustrates a diagrammatic side view of a moving magnet motor system 800 having a plurality of ferromagnetic rods 820 disposed on a magnetic ring 806 and disposed on an inner yoke 816. The moving magnet motor system 800 includes an outer yoke 802 housing a coil 804, the magnetic ring 806 secured to a magnet ring support structure 808 coupled to a rider 810 disposed within a cylinder 818. In some embodiments, the cylinder 818 may include a bearing sleeve (not shown) disposed on the inner surface of the cylinder 818. FIG. 8 illustrates the plurality of ferromagnetic rods 820 having various lengths ranging from the length of the inner yoke 816 to less than half the length of the magnetic ring 806. The plurality of ferromagnetic rods 820 are disposed on the outer surface of the magnetic ring 806 and the outer surface of the inner yoke 816.

In some embodiments, the various lengths and locations of the ferromagnetic rods 820 may be configured for simple calibration of the moving magnet motor system 800. For instance, the larger ferromagnetic rods may generate a larger auxiliary force, and thus, selective rotation of the larger ferromagnetic rods allows for coarse adjustment of the combined auxiliary force. The smaller ferromagnetic rods may generate a smaller auxiliary force, and thus, selective rotation of the smaller ferromagnetic rods allows for fine adjustment of the combined auxiliary force.

Figure 9:
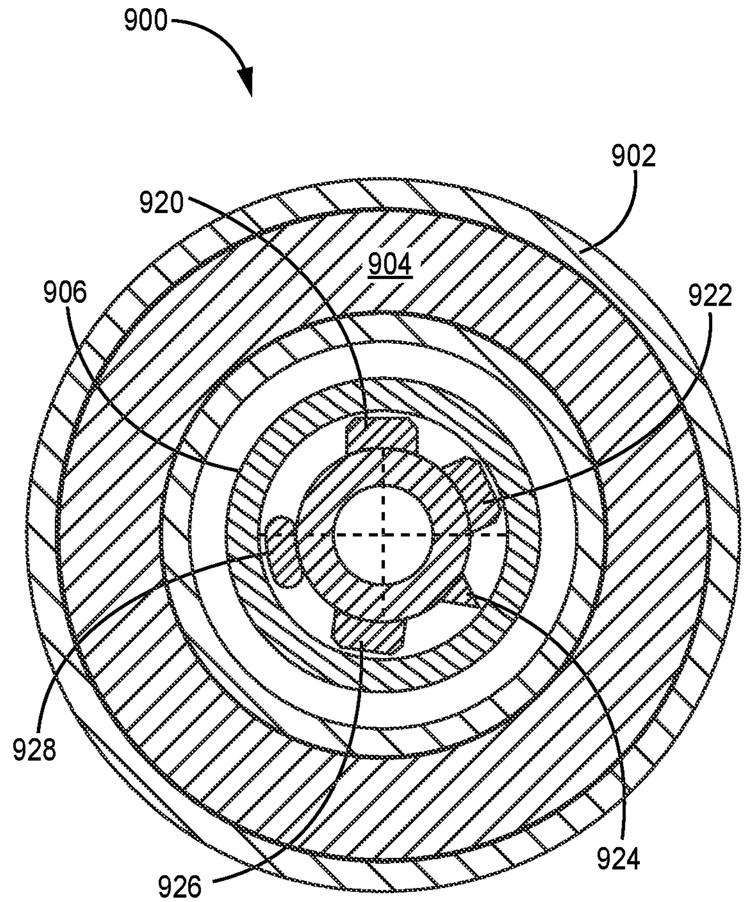
FIG. 9 illustrates a diagrammatic front view of a moving magnet motor system having one or more ferromagnetic rods having a different cross-sectional shape, according to some embodiments.

FIG. 9 illustrates a diagrammatic front view of a moving magnet motor 900 including a plurality of ferromagnetic rods disposed within a magnetic ring 906. The moving magnet motor 900 further includes an outer yoke 902 and a coil 904 surrounding the magnetic ring 906. A first ferromagnetic rod 920, a second ferromagnetic rod 922, and a fourth ferromagnetic rod 926 have a substantially rectangular cross-sectional profile. A third ferromagnetic rod 924 has a substantially triangular cross-sectional profile and a fifth ferromagnetic rod 928 has a substantially rounded cross-sectional profile. The ferromagnetic rods 920, 922, 924, 926, 928 are spaced at various angular distances from each other.

Figure 10B:
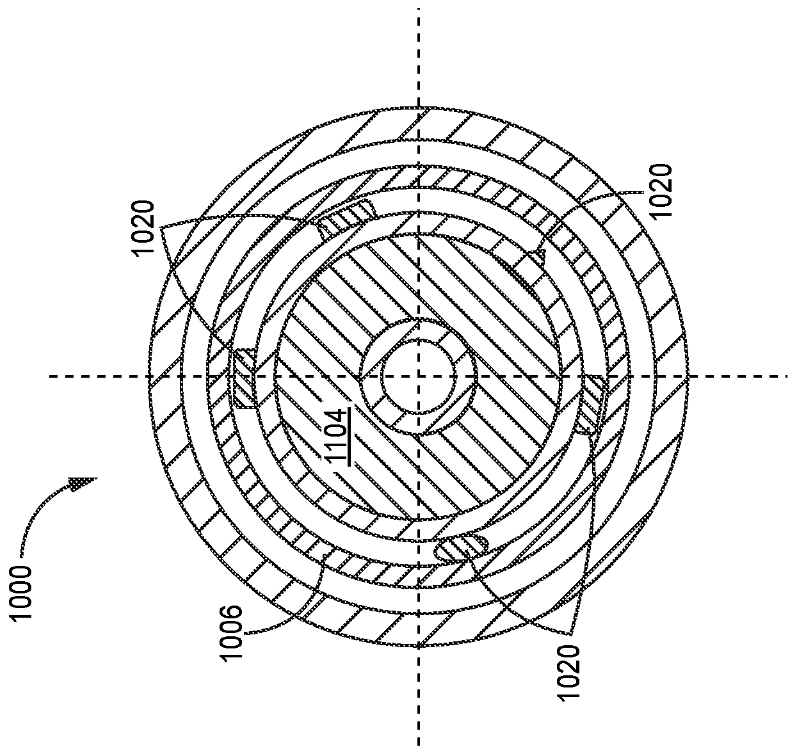
FIG. 10B illustrates a diagrammatic front view of a moving magnet motor system having one or more ferromagnetic rods disposed on an inner yoke wherein a motor coil is disposed radially inward of a magnetic ring, according to some embodiments.
Figure 10A:
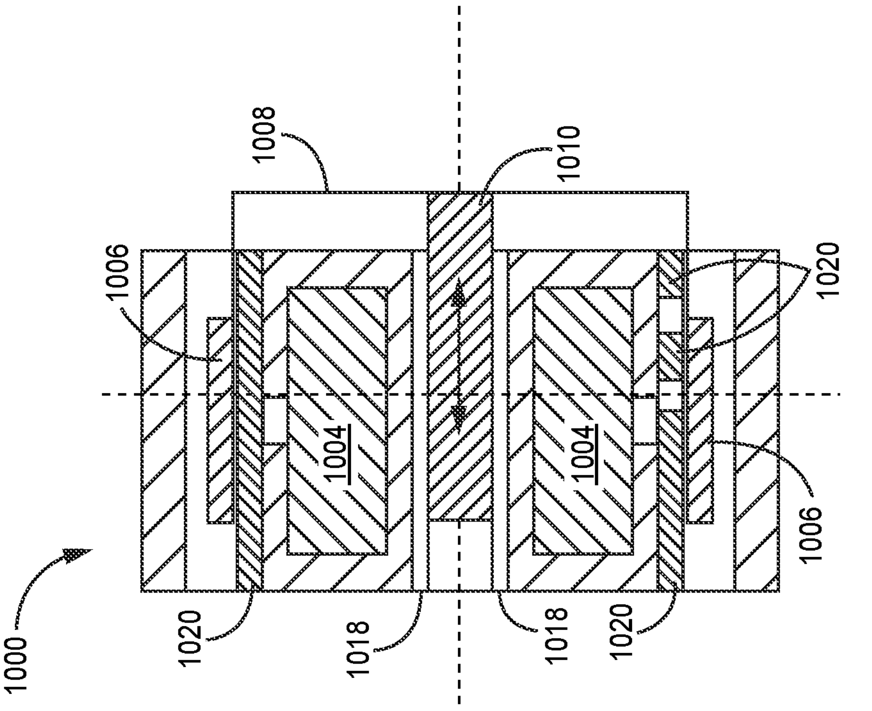
FIG. 10A illustrates a diagrammatic side view of a moving magnet motor system having one or more ferromagnetic rods disposed on an inner yoke wherein a motor coil is disposed radially inward of a magnetic ring, according to some embodiments.

FIGS. 10A-10B illustrate a moving magnet motor 1000 including a coil 1004 disposed inside of a magnetic ring 1006. The coil 1004 may be configured to receive an AC current to generate a magnetic field. The magnetic field may interact with the magnetic ring 1006 disposed radially outward from the coil. A plurality of ferromagnetic rods 1020 are positioned radially outward from the coil 1004 and radially inward from the magnetic ring 1006. The magnetic ring 1006 is connected to a magnet ring support structure 1008 secured to a rider 1010, such that the oscillation of the magnetic ring 1006 drives the rider 1010. The rider 1010 may be configured to oscillated within the cylinder 1018. In some embodiments, the cylinder 1018 may include a bearing sleeve on the inner surface of the cylinder 1018. The plurality of ferromagnetic rods 1020 may vary in length and cross-sectional profile.

Figure 11B:
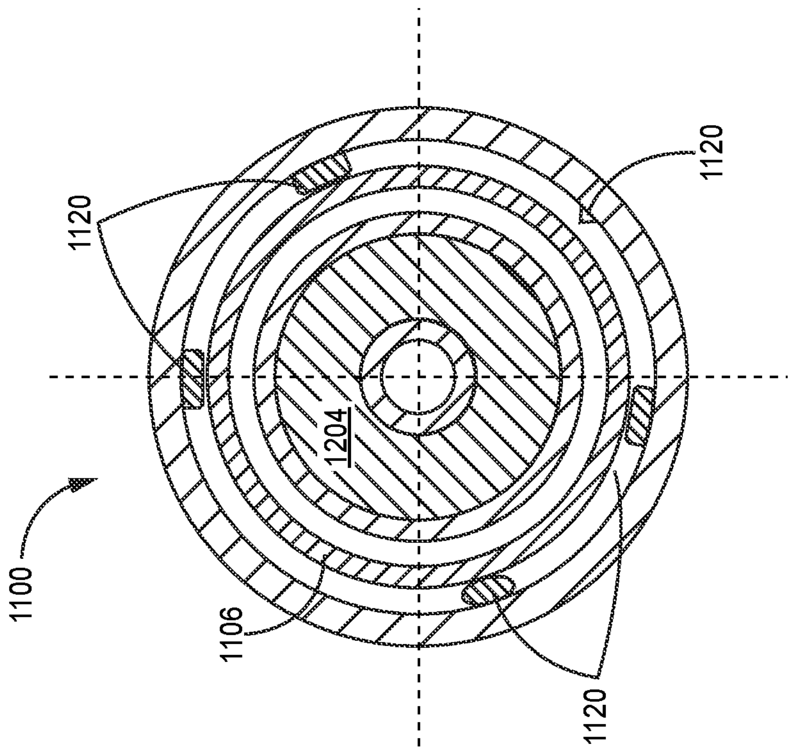
FIG. 11B illustrates a diagrammatic front view of a moving magnet motor system having one or more ferromagnetic rods disposed on an outer yoke wherein a motor coil is disposed radially inward of a magnetic ring, according to some embodiments.
Figure 11A:
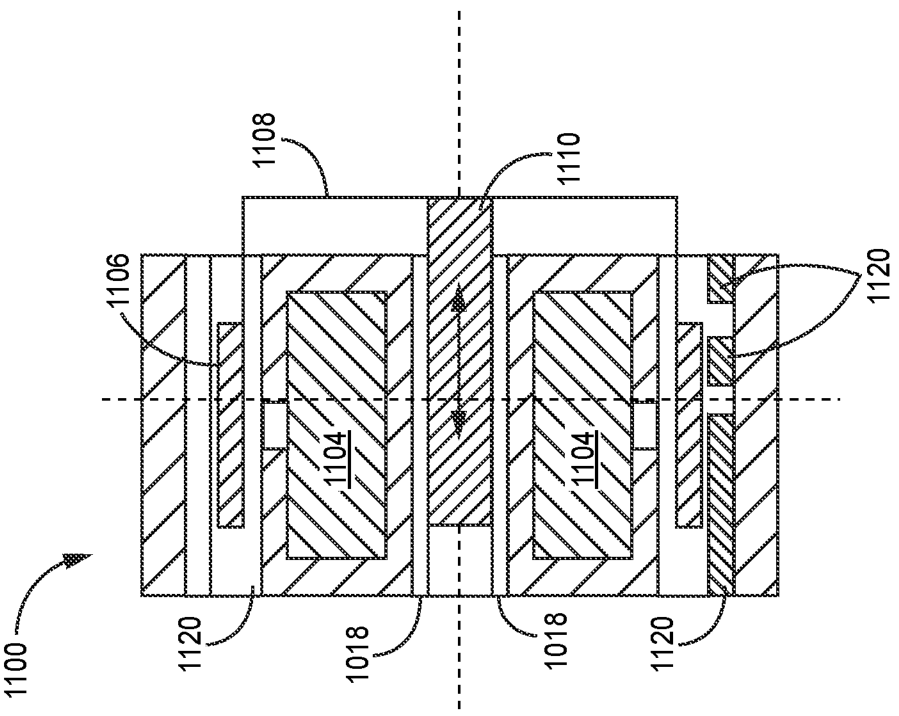
FIG. 11A illustrates a diagrammatic side view of a moving magnet motor system having one or more ferromagnetic rods disposed on an outer yoke wherein a motor coil is disposed radially inward of a magnetic ring, according to some embodiments.

FIGS. 11A-11B illustrate a moving magnet motor 1100 including a coil 1104 disposed inside of a magnetic ring 1106. The coil 1104 may be configured to receive an AC current to generate a magnetic field. The magnetic field may interact with the magnetic ring 1106 disposed radially outward from the coil 1104 to oscillate a rider 1110. A plurality of ferromagnetic rods 1120 are positioned radially outward from the coil 1104 and radially outward from the magnetic ring 1106. The rider 1110 may oscillate within a cylinder 1118, the cylinder including a bearing sleeve (not shown) disposed on the inner surface of the cylinder 1118. The plurality of ferromagnetic rods may be configured to offset or counteract a bearing side load. The magnetic ring 1106 is connected to a magnet ring support structure 1108 secured to the rider 1110. The plurality of ferromagnetic rods 1120 may vary in length and cross-sectional profile.

Figure 12B:
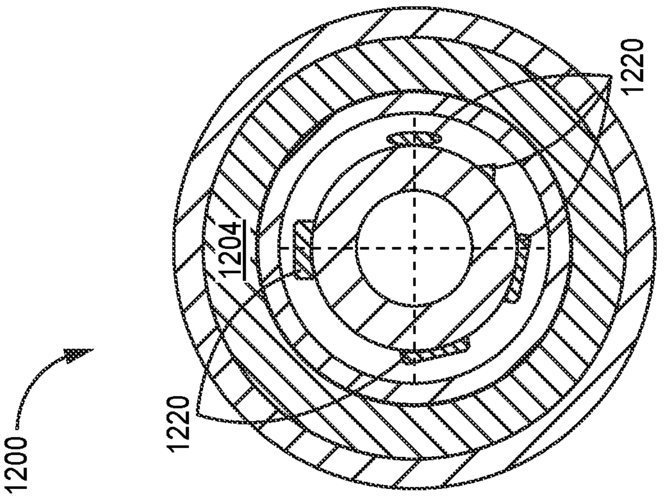
FIG. 12B illustrates a diagrammatic front view of a linear reluctance motor system having one or more ferromagnetic rods, according to some embodiments.
Figure 12A:
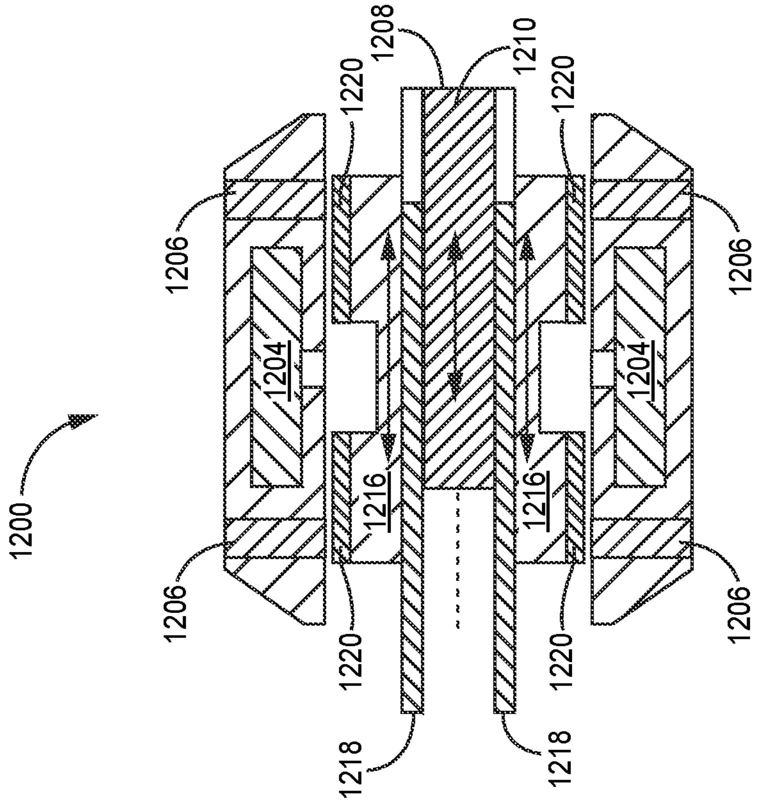
FIG. 12A illustrates a diagrammatic side view of a linear reluctance motor system having one or more ferromagnetic rods, according to some embodiments.

FIGS. 12A-12B illustrate a linear motor 1200 including a coil 1204 configured to generate a magnetic field, a plurality of magnetic features 1206, and an inner yoke support 1208 secured to an inner yoke 1216. The linear motor 1200 may be configured to use magnetic reluctance to enhance performance of the linear motor 1200. For instance, an electrical AC current may be provided to the coil 1204, and the coil 1204 may generate an electromagnetic field. The plurality of magnetic features 1206 may interact with the electromagnetic field and produce a magnetic reluctance. The magnetic reluctance may impart a linear force upon the inner yoke 1216 affixed to the rider 1210, causing the rider 1210 to oscillate. A plurality of ferromagnetic rods 1220 of various lengths and cross-sectional profiles are disposed on the inner yoke 1216. The plurality of ferromagnetic rods 1220 may be configured to offset of counteract a bearing side load. In some embodiments, the plurality of ferromagnetic rods 1220 may be selectively positioned on an outer surface of the inner yoke 1216 to offset a bearing side load. In some embodiments, the inner yoke 1216 may ride on an outer bearing sleeve (not shown) of the cylinder 1218 and oscillate with the rider 1210. In some embodiments, the cylinder 1218 may include an inner bearing sleeve (not shown) on the inner surface of the cylinder 1218.

Figure 13A:
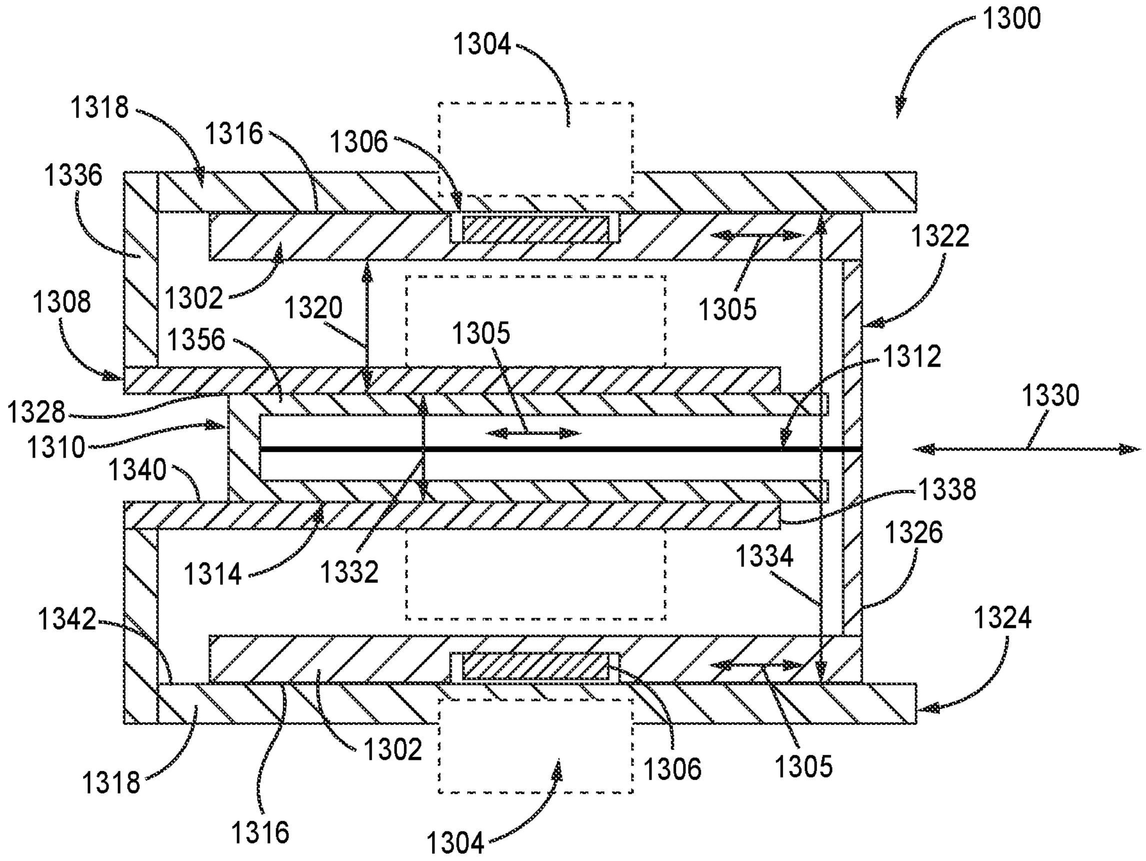
FIG. 13A illustrates a cross sectional side view of a linear motor with a piston separated from a bearing with a coil radially outward from the bearing, according to some embodiments.
Figure 13B:
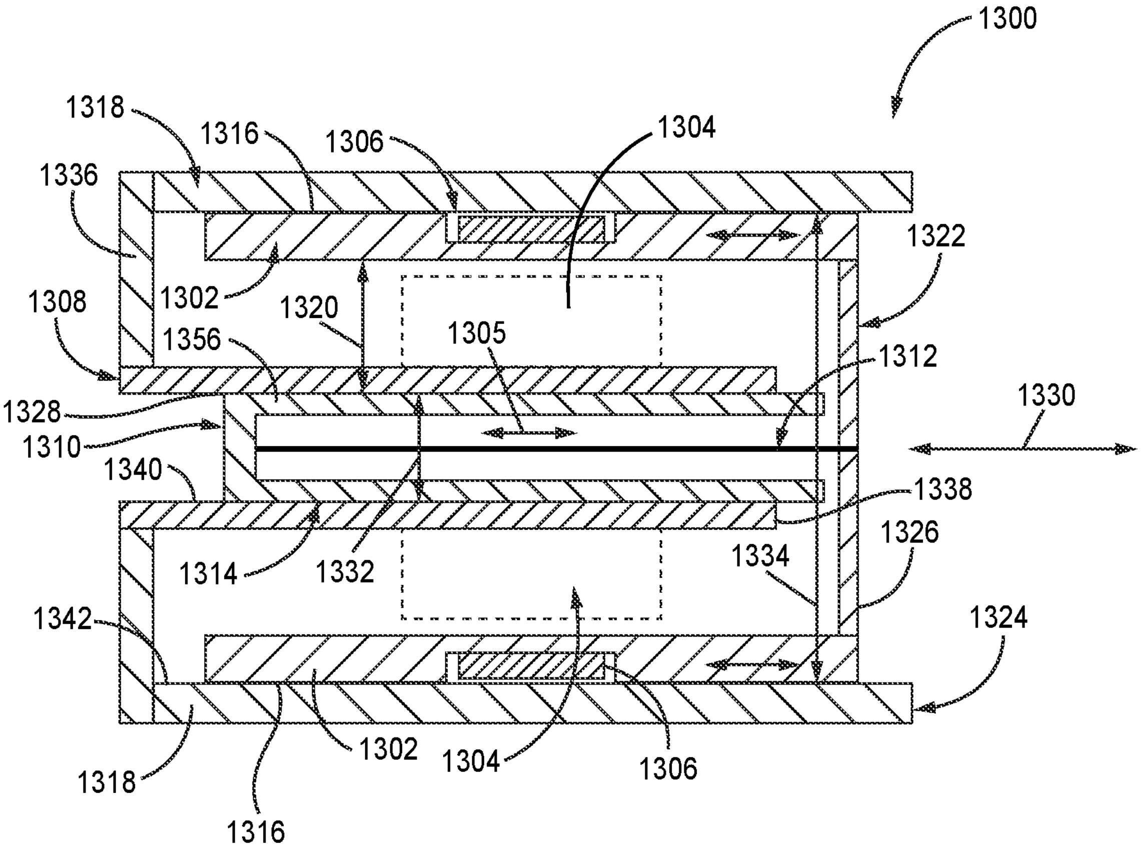
FIG. 13B illustrates a cross sectional side view of a linear motor with a piston separated from a bearing with a coil radially inward from the bearing, according to some embodiments.

FIGS. 13A-C illustrate a linear compressor 1300 with a bearing 1302 which is laterally-decoupled from a piston 1310, according to some embodiments. The linear compressor may include a linear motor, a moving magnetic motor, and/or a reciprocating magnetic machine. The bearing 1302 and the piston 1310 may be decoupled, or physically separated, from one another, i.e., the outer surface of the bearing 1302 is separated from the outer surface of the piston 1310. For example, in the linear motor system 100 illustrated in FIG. 1, the rider 110 functions both as a piston (reciprocating gas-driving element) and a bearing (surface of the reciprocating member in-contact with the cylinder/bearing sleeve 112). Thus, in the embodiment illustrated in FIG. 1, the piston and the bearing are coupled on a single element—the rider 110. In contrast to the linear motor system 100 illustrated in FIG. 1, the linear compressor 1300 includes the piston 1310 (reciprocating gas-driving element) and a separate, decoupled element—the bearing 1302 including a bearing surface 1316 configured to contact a bearing cylinder 1318 as the piston 1310 reciprocates. The bearing surface 1316 may be decoupled (or separated) from the piston 1310 in a radial direction, as illustrated in FIGS. 13A-B. In some embodiments, the bearing surface 1316 may be decoupled from the piston 1310 in an axial direction 1330, i.e., the piston 1310 and the bearing 1302 may be located in-series with each other such that the piston 1310 is not concentrically aligned with the bearing 1302.

Decoupling the gas-driving function of the piston 1310 from side load-bearing function of the bearing 1302 may provide numerous benefits to the linear compressor 1300. In general, linear motors (or linear compressors) used for cryo-refrigerators operate at a resonant frequency for maximum efficiency. The compression and expansion of a filling gas acts as a spring component upon the piston. By selecting a piston diameter 1332, the gas-spring constant is adjusted to thereby achieve a target resonant frequency of the system. Thus, to achieve the target resonant frequency aligned with the desired operational frequency of the cooler, the maximum piston diameter may be limited. However, a small piston diameter reduces the bearing surface of the piston, and thus, a greater bearing load per surface area is placed on the piston and piston bearing surface. The increase in piston-bearing load may reduce the lifetime of the compressor.

Decoupling the piston 1310 from the bearing 1302 enables the piston diameter 1332 to remain small, thereby aligning the resonant frequency with the desired operational frequency of the system, while simultaneously providing a greater bearing surface area to reduce the bearing load placed on the piston 1310. Decoupling the piston 1310 from the bearing 1302 reduces the bearing load per bearing surface area which increases the lifetime of the linear compressor 1300 and allows the desired resonant frequency to be selected via the piston diameter 1332, enhancing the operating efficiency of the linear compressor 1300.

FIG. 13A illustrates a cross sectional side view of the linear compressor 1300 (or linear motor) with the piston 1310 separated from the bearing 1302 with a motor stator 1304 (or compressor stator) located radially outward from the bearing 1302. The linear compressor 1300 includes a stationary assembly 1324 and a rider assembly 1322 configured to reciprocate/oscillate relative to the stationary assembly 1324, as indicated by arrows 1305. As described hereinafter, the motor stator 1304 is a stationary component of the linear motor 1300 that generates an electromagnetic field to urge movement of the rider assembly 1322. In some embodiments, the motor stator 1304 may include a coil and/or a plurality of conductive windings. The rider assembly 1322 may include the bearing 1302 and the piston 1310. A linkage 1312 may mechanically couple the bearing 1302 to the piston 1310. In some embodiments, the linkage 1312 may include a compliant rod to transfer force in an axial direction 1330 (i.e., a direction parallel to a cylindrical axis of a piston cylinder 1308) and compliant in a lateral direction (i.e., a direction orthogonal to the axial direction). The rider assembly 1322 may include a lateral linkage 1326 to mechanically couple the bearing 1302 to the linkage 1312.

The rider assembly 1322 may include a ferromagnetic feature 1306, which may comprise a magnetic or ferromagnetic compound. In some embodiments, the ferromagnetic feature 1306 may include any of the ferromagnetic rods (e.g., ferromagnetic rods 120, 302, 304, 402, 404, etc.) described above in any of FIGS. 1-12B, and may be selectively positioned on the rider assembly 1322 to minimize side load forces. The oscillation of the rider assembly 1322 may be driven by electromagnetic interaction between the motor stator 1304 and the ferromagnetic feature 1306. More specifically, an electrical (AC) current may be provided to the motor stator 1304 (i.e., coils and/or conductive windings) which thereby generates an electromagnetic field that interacts with (i.e., imparts an electromotive force on) the ferromagnetic feature 1306 disposed on the rider assembly 1322, causing the rider assembly 1322 to oscillate. In some embodiments, the oscillation frequency of the rider assembly 1322 may be between 1 Hz and 140 Hz, and in some embodiments, the oscillation frequency of the rider assembly 1322 may be between 30 Hz and 60 Hz.

In some embodiments, the ferromagnetic feature 1306 may be positioned on the bearing 1302 or at least partially within a wall of the bearing 1302. For example. FIG. 13A illustrates the ferromagnetic feature 1306 disposed within a recessed portion of the bearing 1302. In other embodiments (e.g., similar to those shown in FIGS. 1-12), the ferromagnetic feature 1306 may be disposed in other locations on the rider assembly 1322. In some embodiments, the ferromagnetic feature 1306 may include a fixed magnet (fixed onto the movable rider assembly 1322) such as a cylindrical magnet secured to the bearing 1302. In some embodiments, the ferromagnetic feature 1306 may include a ferromagnetic compound (e.g., iron, cobalt, nickel, and/or alloys thereof).

The stationary assembly 1324 may include a piston cylinder 1308 having a first side wall 1340. The first side wall 1340 may be a cylindrical side wall configured to form a cylindrical cavity (i.e., a bore). The piston 1310 may be receivable within the piston cylinder 1308, the piston 1310 including a piston diameter 1332 substantially equal to the diameter of the piston cylinder 1308. The piston 1310 may include a first bearing surface 1314, i.e., the outer surface of the piston 1310 which contacts the first side wall 1340 of the piston cylinder 1308. In some embodiments, a clearance seal 1328 may be disposed between the piston 1310 and the first side wall 1340. The clearance seal 1328 may reduce friction between the piston 1310 and the first side wall 1340 and/or provide a gas seal to prevent gas from traveling between the piston 1310 and the first side wall 1340.

The stationary assembly 1324 may include a bearing cylinder 1318 having a second side wall 1342. The second side wall 1342 may be a cylindrical side wall configured to for a cylindrical cavity. The bearing 1302 may be receivable within the bearing cylinder 1318, the bearing 1302 including a bearing diameter 1334 substantially equal to the diameter of the bearing cylinder 1318. The bearing 1302 may include a second bearing surface 1316, i.e., the outer surface of the bearing 1302 which contacts the second side wall 1342 of the bearing cylinder 1318. In some embodiments, a cylindrical axis of the bearing cylinder 1318 may be parallel to the cylindrical axis of the piston cylinder 1308. The cylindrical axis of the bearing cylinder 1318 may be concentrically aligned with the cylindrical axis of the piston cylinder 1308.

In some embodiments, the stationary assembly 1324 may include a first rider stop 1336 and/or a second rider stop 1338. The first rider stop 1336 may be positioned adjacent to an end of the bearing cylinder 1318. The bearing 1302 may contact the first rider stop 1336 at a forwardmost position along the linear path of oscillation, i.e., the first rider stop 1336 may prevent further forward motion of the rider assembly 1322 by acting as a stop. In some embodiments, the first rider stop 1336 may include an elastic dampening component (e.g., a spring or cushion) and/or a gas dampening component (e.g., a gas spring) configured to dampen the contact force between the bearing 1302 and the first rider stop 1336. The second rider stop 1338 may be positioned adjacent to the piston 1310. The lateral linkage 1326 may contact the second rider stop 1338 at a forwardmost position along the linear path of oscillation. In some embodiments, the second rider stop 1338 may include an elastic or dampening component.

The motor stator 1304 may be positioned on or within the stationary assembly 1324. For example, as illustrated in FIG. 13A, the motor stator 1304 is positioned radially outward from the bearing 1302 on an outer wall of the bearing cylinder 1318. In contrast, FIG. 13B illustrates the motor stator 1304 positioned radially inward from the bearing 1302 on an outer wall of the piston cylinder 1308. An electrical (AC) current may be provided to the motor stator 1304 which thereby generates an electromagnetic field that interacts with (i.e., imparts an electromotive force on) the ferromagnetic feature 1306 disposed on the rider assembly 1322, causing the rider assembly 1322 to oscillate. In some embodiments, the motor stator 1304 may impart a reluctance force on the rider assembly 1322 (i.e., the linear compressor 1300 may be a reluctance motor). In some embodiments, the motor stator 1304 may impart a Lorentz force (induction) on the rider assembly 1322.

The first bearing surface 1314 of the piston 1310 may be separated from the second bearing surface 1316 of the bearing 1302 by a gap 1320. In other words, the piston 1310 may be located within the circumference of the bearing 1302, and the first bearing surface 1314 may be physically separated from the second bearing surface 1316 by a gap 1320. Thus, the first bearing surface 1314 of the piston 1310 is decoupled from the second bearing surface 1316 of the bearing 1302.

As illustrated in FIGS. 13A-B, the bearing diameter 1334 is greater than the piston diameter 1332. Thus, the surface area of the bearing 1302 is greater than the surface area of the piston 1310 (assuming the length of the bearing 1302 and the length of the piston 1310 are similar, where surface area of a cylinder is expressed as $\pi dl$, d is the diameter of the cylinder and l is the length of the cylinder). Hence, the second bearing surface 1316 of the bearing 1302 is greater than the first bearing surface 1314 of the piston 1310. In general, larger bearing surfaces distribute side load forces over a larger surface area, thereby reducing side load per unit of surface area, reducing wear on the bearing surface and increasing the lifespan of the bearing. In some embodiments, the bearing diameter 1334 may be at least two times greater than the piston diameter 1332. In some embodiments, the bearing diameter 1334 may be between 50% and 200% greater than the piston diameter 1332, and in some embodiments the bearing diameter 1334 may be between 33% and 1000% greater than the piston diameter 1332.

A side load force on the rider assembly 1322 would be distributed over the first bearing surface 1314 combined with the second bearing surface 1316. Because the second bearing surface 1316 is larger than the first bearing surface 1314, the second bearing surface 1316 may receive a higher portion of the total side load (i.e., >50% of the total side load) than the first bearing surface 1314. In some embodiments, the second bearing surface 1316 may receive between 50% and 100% of the total side load, and in some embodiments, the second bearing surface 1316 may receive between 70% and 95% of the total side load.

In some embodiments, the linkage 1312 including the laterally compliant rod may reduce the side load on the piston 1310. For instance, the laterally compliant rod may be compliant in the lateral direction (i.e., the direction orthogonal to the axial direction 1330), and thus, any side load or misalignment imparted on the bearing 1302 will not be transferred through the linkage 1312 to the piston 1310. Only the axial motion of the bearing 1302 will be transferred to the piston 1310 through the linkage 1312. The laterally compliant rod may reduce assembly costs, as the piston 1310 need not be in perfect concentric alignment with the bearing 1302. Achieving alignment with microscopic accuracy can be extremely expensive, time consuming, and often difficult to achieve. Misalignment of components connected by rigid linkages may result in side loads, thereby reducing the efficiency and lifespan of the linear compressor. Thus, a laterally compliant feature of the linkage 1312 may alleviate the requirement for microscopic alignment with tight tolerances, reducing assembly costs and improving the efficiency and lifespan of the linear compressor 1300.

In some embodiments, the piston 1310 may include a hollow body. The linkage 1312 may extend through the hollow body of the piston 1310. The linkage 1312 may be coupled to the piston 1310 at or near a piston head 1356. The piston 1310 may include the hollow body to optimize piston weight and improve efficiency and/or resonant frequency.

Figure 14:
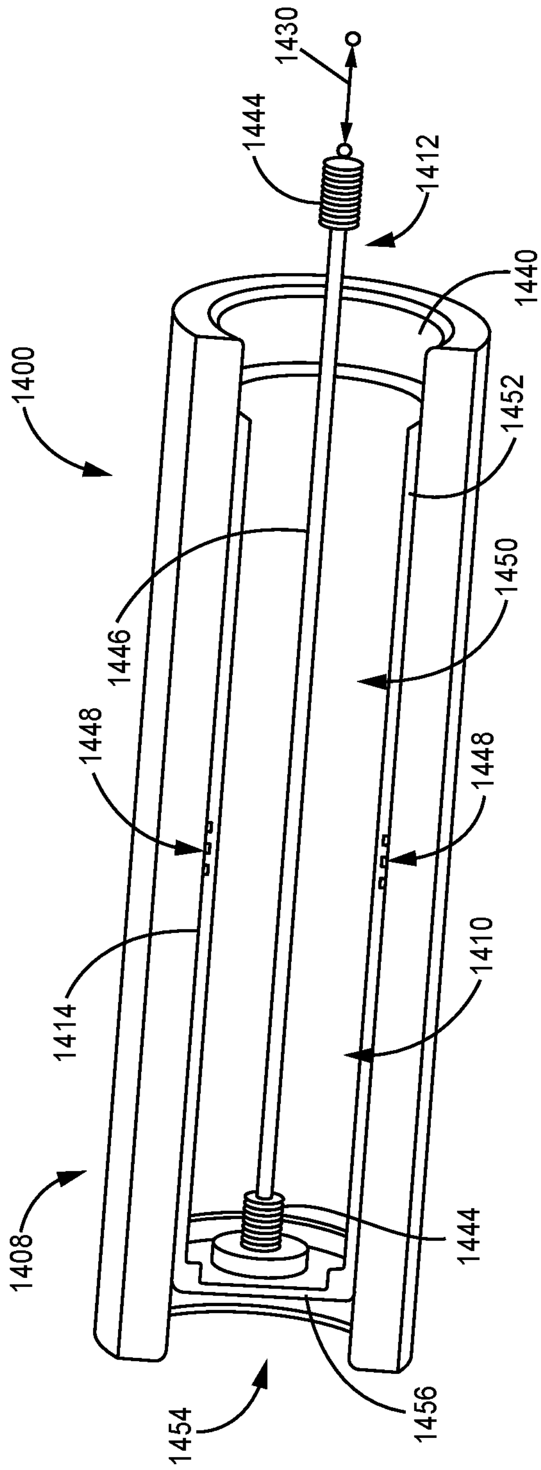
FIG. 14 illustrates a cross sectional isometric view of a piston assembly disposed within a piston cylinder, according to some embodiments.

FIG. 14 illustrates a cross sectional isometric view of a piston assembly 1400 disposed within a piston cylinder 1408, according to some embodiments. The piston assembly 1400 may include a piston 1410 received within a piston cylinder 1408. The piston 1410 includes a first bearing surface 1414 in contact with a cylinder side wall 1440 of the piston cylinder 1408. In some embodiments, the piston 1410 includes a gas bearing cavity 1448 configured to receive gas therein and utilize the received gas as a gaseous bearing to reduce friction and/or side load forces.

The piston assembly 1400 may include a linkage 1412 to deliver axial force to the piston 1410. The linkage 1412 may include one or more laterally compliant features 1444 compliant in the lateral direction (i.e., the direction orthogonal to an axial direction 1430). The laterally compliant features 1444 may include a coiled member or spring configured to deliver force under compression or tension, but compliant (i.e., bendable and unable to deliver force) under torsion, shear, or bending forces. The linkage 1412 may include a non-compliant feature 1446 (i.e., a rigid rod) and the laterally compliant feature 1444. All lateral forces may be cancelled, or untransferable, through the laterally compliant feature 1444, and thus, a single laterally compliant feature 1444 can be used. In some embodiments, a first laterally compliant feature 1444 may be located on a first end of the non-compliant feature 1446 and a second laterally compliant feature 1444 located on a second end of the non-compliant feature 1446.

The piston 1410 may include a hollow body 1450. The linkage 1412 may extend through the hollow body 1450 of the piston 1410 and couple to the piston 1410 adjacent to a piston head 1456. The piston 1410 include a piston shell 1452 forming the outer later of the piston 1410. The piston shell 1452 and hollow body 1450 may be configured to optimize piston weight and improve efficiency and/or resonant frequency. The cylinder side wall 1440 of the piston cylinder 1408 may have a greater thickness than the piston shell 1452. In some embodiments, the piston shell 1452 may be formed of a lightweight metal or metal alloy to reduce weight.

The piston assembly 1400 may include a compressor chamber 1454. The compressor chamber 1454 may be at least partially defined by first side wall 1340 of the piston cylinder 1408. The piston head 1456 may oscillate along the axial direction 1430 and compress gas within the compressor chamber 1454.

Figure 15A:
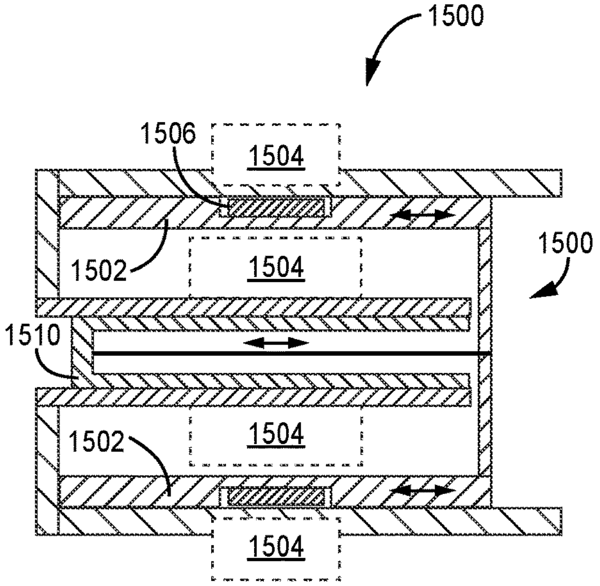
FIG. 15A illustrates a is a cross sectional side view of a linear motor with a reciprocating rider assembly moving along a linear path, according to some embodiments.
Figure 15B:
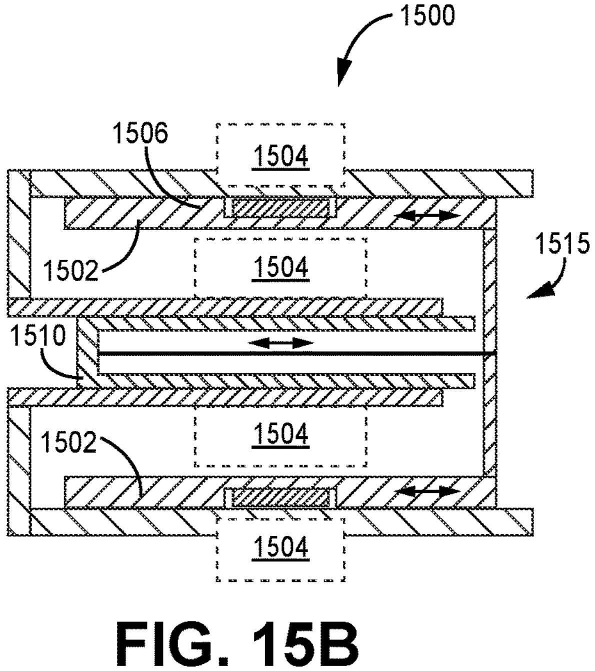
FIG. 15B illustrates a is a cross sectional side view of a linear motor with a reciprocating rider assembly moving along a linear path, according to some embodiments.
Figure 15C:
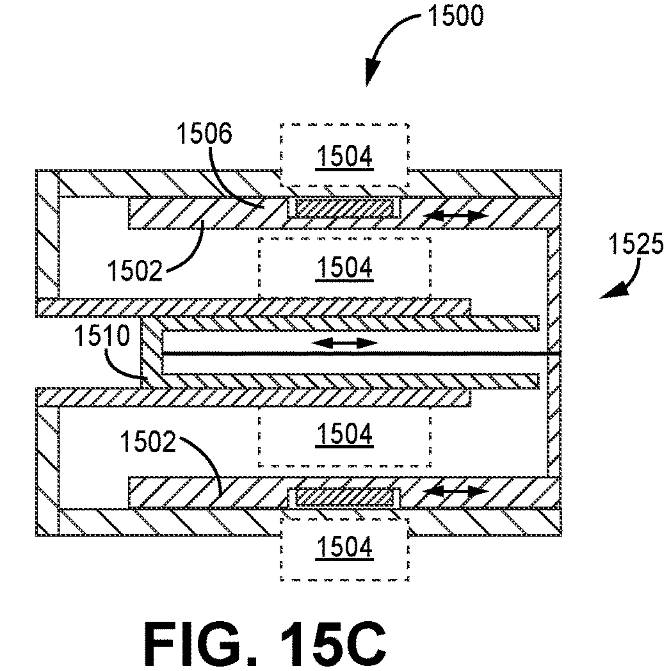
FIG. 15C illustrates a is a cross sectional side view of a linear motor with a reciprocating rider assembly moving along a linear path, according to some embodiments.

FIGS. 15A-C illustrate cross sectional side views of a linear compressor 1500 with a reciprocating rider assembly moving along a linear path, according to some embodiments. The linear compressor 1500 may include any and/or all elements of the linear compressor 1300 or the piston assembly 1400 described above. The linear compressor 1500 may include a piston 1510 and a bearing 1502 reciprocating on a stationary assembly, including a motor stator. The linear compressor 1500 may include one or more motor stators 1504 (i.e., coils or conductive winds) positioned on the stationary assembly. FIGS. 15A-C illustrate exemplary locations of the one or more motor stators 1504 positioned on the stationary assembly. An electrical (AC) current may be provided to the one or more motor stators 1504 which thereby generate a magnetic field that interacts with (i.e., supplies a magnetic force to) a magnetic feature 1506 disposed on the bearing 1502, causing the bearing 1502 and the piston 1510 to oscillate. In some embodiments, the ferromagnetic feature 1506 may include a fixed magnet (fixed onto the movable rider assembly) such as a cylindrical magnet secured to the bearing. In some embodiments, the ferromagnetic feature 1506 may include a ferromagnetic compound (e.g., iron, cobalt, nickel, and/or alloys thereof).

FIG. 15A illustrates the bearing 1502 and the piston 1510 (i.e., the rider assembly) in a first position 1505 along a linear path. FIG. 15B illustrates the rider assembly in a second position 1515 along the linear path, and FIG. 15C illustrates the rider assembly in a third position 1525 along the linear path. The linear path may be defined as the linear motion of the rider assembly from the first position to the third position, and vice-versa as the rider assembly oscillates/reciprocates along the linear path.

While the disclosure has been described with reference to an exemplary embodiment(s), it will be understood by those skilled in the art that various changes may be made, and equivalents may be substituted for elements thereof without departing from the scope of the embodiment(s). In addition, many modifications may be made to adapt a particular situation or material to the teachings of the embodiment(s) without departing from the essential scope thereof. Therefore, it is intended that the disclosure is not limited to the disclosed embodiment(s), but that the disclosure will include all embodiments falling within the scope of the appended claims. Various examples have been described. These and other examples are within the scope of the following claims.

What is claimed is:

1. A linear compressor, comprising:

a piston cylinder having a first diameter and extending along a first cylindrical axis, the piston cylinder including a first side wall;

a piston disposed within the piston cylinder, the piston movable along the first cylindrical axis within the piston cylinder, the piston including a first bearing surface in contact with the first side wall of the piston cylinder;

a bearing cylinder having a second diameter and extending along a second cylindrical axis, the bearing cylinder including a second side wall;

a bearing disposed within the bearing cylinder, the bearing movable along the second cylindrical axis within the bearing cylinder, the bearing including a second bearing surface in contact with the second side wall, wherein side load forces are distributed between the first bearing surface and the second bearing surface;

a linkage mechanically coupling the piston to the bearing;

a motor stator configured to generate an electromagnetic field; and a ferromagnetic feature configured to interact with the electromagnetic field generated by the motor stator to impart linear force on the piston, wherein the ferromagnetic feature is separate from the bearing and does not contribute to the second bearing surface, and wherein the second diameter is greater than the first diameter.

2. The linear compressor of claim 1, wherein the second cylindrical axis is concentrically aligned with the first cylindrical axis, and wherein the piston cylinder is disposed radially inward from the bearing cylinder relative to the first cylindrical axis.

3. The linear compressor of claim 1, wherein the motor stator is disposed radially outward from the second side wall of the bearing cylinder and wherein the ferromagnetic feature is secured to the bearing.

4. The linear compressor of claim 1, wherein the motor stator is disposed radially inward from the bearing cylinder.

5. The linear compressor of claim 1, wherein both the motor stator and the ferromagnetic feature are disposed radially outward from the first bearing surface.

6. The linear compressor of claim 1, wherein the ferromagnetic feature includes a cylindrical magnet fixed to the bearing.

7. The linear compressor of claim 1, wherein the linkage includes a compliant rod to transfer force in an axial direction and compliant in a lateral direction.

8. The linear compressor of claim 1, wherein the second bearing surface receives between 50% and 95% of the side load force.

9. The linear compressor of claim 1, wherein the bearing provides a larger bearing surface area than the piston.

10. A linear compressor system, comprising:

a stationary assembly including:

a first cylinder having a first cylinder wall extending along a first cylindrical axis, and a second cylinder having a second cylinder wall extending along a second cylindrical axis parallel to the first cylindrical axis; and a rider assembly movable along a linear path parallel to the first cylindrical axis, the rider assembly including:

a piston disposed within the first cylinder, the piston including a first bearing surface in contact with the first cylinder wall, a bearing disposed within the second cylinder, the bearing including a second bearing surface in contact with the second cylinder wall, a ferromagnetic feature, wherein the ferromagnetic feature is separate from the bearing and does not contribute to the second bearing surface, and a linkage mechanically coupling the piston to the bearing, wherein the first bearing surface is separated from the second bearing surface by a gap spanning a direction perpendicular to the linear path.

11. The linear compressor system of claim 10, wherein:

the stationary assembly includes a motor stator configured to generate an electromagnetic field, and the rider assembly includes a ferromagnetic feature configured to interact with the electromagnetic field generated by the motor stator to impart linear force on the rider assembly.

12. The linear compressor system of claim 11, wherein the ferromagnetic feature is secured to the bearing and the motor stator is secured to the second cylinder.

13. The linear compressor system of claim 10, wherein the second bearing surface of the bearing has a larger surface area than the first bearing surface of the piston.

14. The linear compressor system of claim 10, wherein the first cylinder wall of the first cylinder is disposed radially inward from the second cylinder wall of the second cylinder and wherein the first cylindrical axis and the second cylindrical axis are concentrically aligned.

15. The linear compressor system of claim 10, wherein the piston includes a hollow body with the linkage extending therethrough, and wherein a clearance seal is disposed between the first bearing surface of the piston and the first cylinder wall.

16. The linear compressor system of claim 10, wherein a side load force between the rider assembly and the stationary assembly is distributed between the first bearing surface and the second bearing surface, wherein the second bearing surface receives between 50% and 100% of the side load force.

17. The linear compressor system of claim 10, wherein the linkage includes a laterally compliant rod configured to transfer axial forces parallel to the linear path.

18. The linear compressor system of claim 10, wherein:

the stationary assembly includes a motor stator configured to generate an electromagnetic field, and the rider assembly includes a ferromagnetic feature configured to interact with the electromagnetic field generated by the motor stator such that the motor stator imparts a reluctance force on the rider assembly.

19. The linear compressor system of claim 10, wherein side load forces are distributed between the first bearing surface and the second bearing surface.

20. The linear compressor system of claim 10, wherein the linkage further comprises a laterally compliant feature configured to transfer axial forces parallel to the linear path while reducing transfer of lateral side loads from the bearing to the piston.

* * * * *